(12) United States Patent
Osugi

(10) Patent No.: US 8,379,989 B2
(45) Date of Patent: Feb. 19, 2013

(54) IMAGE SEARCH APPARATUS AND IMAGE PROCESSING APPARATUS

(75) Inventor: Masamichi Osugi, Shizuoka (JP)

(73) Assignee: Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 995 days.

(21) Appl. No.: 12/415,038

(22) Filed: Mar. 31, 2009

(65) Prior Publication Data

US 2009/0245657 A1    Oct. 1, 2009

(30) Foreign Application Priority Data

Apr. 1, 2008 (JP) ............................. P2008-095329
May 8, 2008 (JP) ............................. P2008-122463

(51) Int. Cl.
*G06K 9/62* (2006.01)
(52) U.S. Cl. ......... 382/209; 382/190; 382/199; 382/219
(58) Field of Classification Search .................. 382/103, 382/190, 195, 199, 209, 219, 305
See application file for complete search history.

(56) References Cited

U.S. PATENT DOCUMENTS

| 6,718,063 | B1* | 4/2004 | Lennon et al. ............... 382/224 |
| 6,990,233 | B2* | 1/2006 | Park et al. .................... 382/164 |
| 2005/0078885 | A1* | 4/2005 | Ozaki et al. ................... 382/305 |
| 2007/0009100 | A1* | 1/2007 | Kikuchi et al. ............... 380/203 |
| 2008/0025646 | A1* | 1/2008 | Aguera y Arcas et al. ... 382/305 |

FOREIGN PATENT DOCUMENTS

| JP | 7-107683 | 11/1995 |
| JP | 8-263522 | 10/1996 |
| JP | 11-312248 | 11/1999 |
| JP | 2000-023141 | 1/2000 |
| JP | 2000-163576 | 6/2000 |
| JP | 2000-348184 | 12/2000 |
| JP | 2001-008189 | 1/2001 |
| JP | 2002-157598 | 5/2002 |
| JP | 2002-247557 | 8/2002 |
| JP | 2003-157440 | 5/2003 |

(Continued)

OTHER PUBLICATIONS

A. McIvor, "Background Subtraction Techniques," https://uuu.enseirb.fr/~megret/Enseignement/Projet_E2_S4/Videosurveillance/papers/mcivor%20-%20Background%20Substraction%20Techniques%20-%20ivcnz00.pdf, 2000.

(Continued)

*Primary Examiner* — Phuoc Tran
(74) *Attorney, Agent, or Firm* — Finnegan, Henderson, Farabow, Garrett & Dunner, L.L.P.

(57) ABSTRACT

An image search apparatus provides searching for a search-target image corresponding to an input image from among a plurality of search-target images. The image search apparatus includes a characteristic partial image detection unit and a search unit. The characteristic partial image detection unit detects a characteristic partial image of each search-target image based on a dissimilarity level of a partial image at a corresponding position among a plurality of search-target images. The search unit respectively calculates a level of coincidence between a characteristic partial image of each search-target image detected by the characteristic partial image detection unit and a partial image of an input image. The search unit further searches for a search-target image corresponding to an input image from among a plurality of search-target images based on the coincidence level.

12 Claims, 20 Drawing Sheets

FOREIGN PATENT DOCUMENTS

| | | |
|---|---|---|
| JP | 2003-168118 | 6/2003 |
| JP | 2004-21430 | 1/2004 |
| JP | 2004-227527 | 8/2004 |
| JP | 2004-343352 | 12/2004 |
| JP | 2005-78195 | 3/2005 |
| JP | 2006-011832 | 1/2006 |
| JP | 2006-079458 | 3/2006 |
| JP | 2006-338313 | 12/2006 |
| JP | 2007-66124 | 3/2007 |
| WO | WO 2005/001593 | 1/2005 |

OTHER PUBLICATIONS

M. Piccardi, "Background Subtraction Techniques: A Review," http://www-staff.it.uts.edu.au/~massimo/BackgroundSubtractionReview-Piccardi.pdf, 2004.

Hirono, A. et al., "Measuring System for Distribution of People in Office," No. 81, Mar. 24, 2003, pp. 18-23.

* cited by examiner

IMAGE SEARCH APPARATUS AND IMAGE PROCESSING APPARATUS

BACKGROUND OF THE INVENTION

1. Field of the Invention

The present invention relates to an image search apparatus and an image processing apparatus, and in particular to an image processing apparatus that performs image processing for selecting an image that is suitable for use in image processing from among a plurality of images.

2. Related Background Art

As a method of detecting an object using a security camera or the like, known is a method of performing background differential with a taken image that is momentarily input and a background image that is taken in advance in the same position and same posture as the taken image, and detecting an object by extracting a region containing a difference between the two. Nevertheless, if the lighting conditions (in particular, weather conditions and time of imaging if outdoors) are different at the time of taking the input image and at the time of taking the background image, the appearance of shadows will differ in the input image and the background image. Consequently, it is not possible to specify whether the region that was extracted with the background differential is a shadow or an object that newly appeared. Thus, in order to perform high-precision background differential, it is necessary to take background images in advance under various lighting conditions, search for a background image having the same lighting conditions as the input image among a plurality of background images taken under the various lighting conditions, and perform background differential with the input image and the background image having the same lighting conditions.

As a method of searching for an image among a plurality of search-target images, there is a method of searching for an image having the same characterizing portion as the input image based on the characterizing portion as a search key that is designated by an operator or designated automatically. The image search apparatus described in Japanese Patent Application Laid-Open No. 2004-21430 calculates the similarity of corresponding regions between the reference image and each of the plurality of search-target images, seeking a similarity level based on a characteristic amount of a certain region with high similarity, and extracting an image that is similar to the reference image among a plurality of search-target images based on that similarity level (Patent Literature 1: Japanese Patent Application Laid-Open No. 2004-21430, Patent Literature 2: Japanese Patent Application Laid-Open No. 2000-163576, Patent Literature 3: Japanese Patent Application Laid-Open No. H11-312248, Patent Literature 4: Japanese Patent Application Laid-Open No. H8-263522).

Meanwhile, conventionally known is an image processing apparatus for extracting a similar image among a plurality of images (for instance, refer to Japanese Patent Publication No. H7-107683). This image processing apparatus extracts a characteristic amount from an image that was input, and, with the extracted characteristic amount as the key, searches for an image having a characteristic amount that is similar to such key from an image database, and thereby automatically extracts an image that is similar to the image that was input (Japanese Patent Publication No. H7-107683).

SUMMARY OF THE INVENTION

With the image search methods described above, real time performance is required depending on the applied usage. For example, in order to detect an obstacle from an input image in an obstacle detection apparatus that is installed in a vehicle, a background image having the same lighting conditions as the input image may be searched. However, the detection of obstacles in real time will be an essential requirement for use in vehicles as described above. Nevertheless, with the image search apparatus described above, since it is necessary to seek the respective similarity levels between the reference image (input image for example) and a plurality of search-target images, the computing cost will increase and this is unsuitable for real time processing. In addition, with vehicles, an operator (driver) will not be able to designate the search key or background image itself on a case-by-case basis.

Meanwhile, when performing image processing to a plurality of similar images or a plurality of images that were taken and acquired by including a common spot as described above, there is a method of extracting an image with the least disturbance among the plurality of images and performing image processing to such image with low disturbance. However, although the image processing apparatus disclosed in Japanese Patent Publication No. H7-107683 is able to extract similar images, there is a problem in that it is unable to select, among a plurality of similarly image, an image that is less affected by disturbance among the plurality of images that were taken and acquired by including a common spot under a plurality of different environmental conditions.

Thus, an object of the present invention is to provide an image search apparatus capable of performing image search automatically and in real time, and to provide an image processing apparatus capable of selecting an image with low disturbance among a plurality of images that were taken and acquired by including a common spot.

The image search apparatus according to the present invention is an image search apparatus for searching for a search-target image corresponding to an input image from among a plurality of search-target images. The image search apparatus comprises a characteristic partial image detection unit for detecting a characteristic partial image of each search-target image based on a dissimilarity level of a partial image at a corresponding position among a plurality of search-target images, and a search unit for respectively calculating a level of coincidence between a characteristic partial image of each search-target image detected with the characteristic partial image detection unit and the partial image of the input image, and searching for a search-target image corresponding to the input image from among a plurality of search-target images based on the coincidence level.

With this image search apparatus, the characteristic partial image detection unit respectively extracts a partial image at a corresponding position (same position) among a plurality of search-target images, and detects a characteristic partial image of each search-target image based on a dissimilarity level between the corresponding partial images of different search-target images. Specifically, a partial image of an arbitrary search-target image is compared with a partial image of another search-target image at the same position, and a partial image that is not similar to the other search-target image (partial image that appears characteristically in such arbitrary search-target image). Accordingly, by using this characteristic partial image as a search key, differentiation from the other search-target image is enabled. In cases where a characteristic partial image is respectively detected in a plurality of search-target images and an input image is input, with the image search apparatus of the present invention, the search unit respectively calculates a coincidence level of a characteristic partial image of each search-target image and a partial image of an input image, and extracts a search-target image having a partial image that is similar to the input image among a plurality of search-target images based on each coincidence level with a plurality of search-target images. As described above, with the image search apparatus of the present invention, since it is possible to preliminarily decide a characteristic partial image to become a search key from a dissimilarity level among a plurality of search-target images without regard to the input image, it is possible to alleviate the processing load after the input image is input, and thereby perform the image search automatically and in real time. Consequently, the present invention can be applied to various apparatuses that require real time performance.

With the foregoing image search apparatus of the present invention, the search unit preferably calculates a level of coincidence between a characteristic partial image of a search-target image and the partial image of the input image at a corresponding position.

Upon calculating a coincidence level between a characteristic partial image of each search-target image and a partial image of an input image, the search unit of the image search apparatus of the present invention extracts a partial image from the input image at a position that is corresponding to a characteristic partial image of a search-target image, and calculates a coincidence level between the partial images at the corresponding position. As described above, with the image search apparatus of the present invention, since a coincidence level is calculated only between the partial images at a corresponding position (same position) in the image without calculating a coincidence level of the partial images at an arbitrary position of the input image, it is possible to alleviate the processing load and further improve the search speed.

With the foregoing image search apparatus of the present invention, the characteristic partial image detection unit may includes a candidate extraction unit for extracting a candidate of a characteristic partial image from each search-target image, an appearance number counting unit for counting, for each candidate of a characteristic partial image of an arbitorary search-target image extracted by the candidate extraction unit, the number of times that the partial image of the candidate appears in other search-target images, and a detection unit for detecting a candidate with a low appearance count counted by the appearance number counting unit as a characteristic partial image.

The characteristic partial image detection unit of the image search apparatus according to the present invention uses a candidate extraction unit to extract a partial image to become a candidate of a characteristic partial image among the respective search-target images. Moreover, the characteristic partial image detection unit uses an appearance number counting unit to count the number of times that a partial image that is the same as the partial image of such candidate appears in the other search candidate images for each candidate of a characteristic partial image of an arbitrary search candidate image. If there are many search candidate images having the same partial image as the partial image of the candidate of the arbitrary search candidate image, the partial image of that candidate is not an image that is uniquely held by the arbitrary search candidate image. Meanwhile, if there are few search candidate images having the same partial image as the partial image of the candidate of the arbitrary search candidate image (in particular, if there is no other search candidate image having the partial image of that candidate), the partial image of that candidate will be an image that is uniquely held by the arbitrary search candidate image. Thus, the characteristic partial image detection unit uses a detection unit to detect a partial image of a candidate with a low appearance count as a characteristic partial image of a search-target image. As described above, with the image search apparatus of the present invention, by using a partial image that does not appear in the other search-target images as the characteristic partial image, a characteristic partial image that is appropriate as a search key of the search-target image can be decided. A high-precision image search can be performed by conducting the image search with this characteristic partial image.

Since the present invention is able to preliminarily decide a characteristic partial image to become a search key from a dissimilarity level among a plurality of search-target images without regard to the input image, the image search can be performed automatically and in real time.

In addition, the image processing apparatus of the present invention that solved the foregoing problems comprises an image input unit for inputting a plurality of images picked up and acquired including a common spot under a plurality of different environmental conditions, an image memory unit for storing the plurality of images, an environmental condition-added region extraction unit for extracting an environmental condition-added region added based on the environmental conditions in each of the plurality of images, and an added environmental condition reference selection-image selection unit for selecting an added environmental condition reference selection image among a plurality of images stored in the image memory unit based on an area of the environmental condition-added region.

With the image processing apparatus according to the present invention, an environmental condition-added region that was added based on the environmental conditions in each of the plurality of images is extracted regarding a plurality of images that were taken and acquired by including a common spot under a plurality of different environmental conditions, and an added environmental condition reference selection image is selected among a plurality of images stored in the image memory unit based on an area of the environmental condition-added region. Consequently, it is possible to select an image with low disturbance among a plurality of images that were taken and acquired by including a common spot.

Here, the added environmental condition reference selection-image selection unit may take the form of an added environmental condition small-size-image selection unit for selecting an environmental load condition small-size-image, in which the area of the environmental condition-added region is smaller than a prescribed area, from among a plurality of images stored in the image memory unit. Otherwise, the added environmental condition reference selection-image selection unit may also take the form of an added environmental condition minimal image selection unit for selecting an image, in which an area of the environmental condition-added region is smallest, as an environmental load condition minimal-image among a plurality of images stored in the image memory unit.

As described above, as a result of using an environmental load condition small-size-image in which the area of the environmental condition-added region is smaller than a prescribed area or an image in which the area of the environmental condition-added region is the smallest, it is possible to select an image with even lower disturbance.

Here, the environmental condition-added region extraction unit may take the form of extracting the environmental condition-added region by performing statistical processing to the plurality of images.

As a result of extracting the environmental condition-added region based on the foregoing statistical processing, the environmental condition-added region can be easily and accurately extracted.

Moreover, the environmental condition-added region extraction unit may take the form of including an edge image conversion unit for converting each of the plurality of images into an edge image, an edge image memory unit for storing the plurality of edge images converted by the edge image conversion unit, an edge appearance count measurement unit for measuring the number of edge appearances in a prescribed region of the plurality of edge images, an edge frequent appearance region extraction unit for extracting an edge frequent appearance region as a prescribed region from among the prescribed regions in which the number of edge appearances exceeds a prescribed threshold value, and an edge frequent appearance region memory unit for storing the edge frequent appearance region. Further, the added environmental condition reference selection-image selection unit may take the form of including a high frequency edge image creation unit for creating a high frequency edge image based on each edge frequent appearance region in the plurality of edge images, and an approximation level reference edge image extraction unit for extracting an approximation level reference selection edge image among a plurality of edge images stored in the edge image memory unit based on an approximation level relative to that of the high frequency edge image. In addition, the added environmental condition minimal image selection unit may also take the form of selecting an image corresponding to the approximation level reference selection edge image as the added environmental condition reference selection image from among a plurality of images stored in the image memory unit.

The image processing apparatus according to the present invention creates a high frequency edge image based on an edge frequent appearance region in a plurality of edge images, and extracts an approximation level reference edge image based on the approximation level relative to that of the high frequency edge image. Moreover, as the added environmental condition reference selection image, an image corresponding to the approximation level reference selection edge image is selected among a plurality of images stored in the image memory unit. Consequently, an image having a high proportion of the edge frequent appearance region can be selected as the added environmental condition reference selection image. Accordingly, the influence of noise other than the added environmental condition in a plurality of images that were taken and acquired by including a common spot can be reduced, and an image with low disturbance can be selected.

Here, the approximation level reference edge image extraction unit can take the form of extracting, as an approximation level reference selection edge image, a high approximate edge image which is an edge image in which an approximation level relative to that of the high frequency edge image exceeds a prescribed threshold value. Otherwise, the approximation level reference edge image extraction unit can also take the form of extracting, as an approximation level reference selection edge image, an approximate edge image which is an edge image that is most approximate to the high frequency edge image.

As described above, as a result of using, as the approximation level reference selection edge image, a high approximate edge image as an edge image in which the approximation level relative to that of the high frequency edge image exceeds a prescribed threshold value or an approximate edge image as an edge image that is the most approximate to the high frequency edge image, an image with even lower disturbance can be selected.

Moreover, the environmental condition-added region extraction unit may take the form of including an edge image conversion unit for converting each of the plurality of images into an edge image, and an edge amount calculation unit for calculating an edge amount of each of the prescribed regions in each of the edge images. Further, the added environmental condition reference selection-image selection unit may also take the form of including an edge amount occupancy level reference selection edge image selection unit for selecting an edge amount occupancy level reference selection edge image based on an edge amount occupancy level of the prescribed region in the edge image, and an edge amount occupancy level reference selection image selection unit for selecting an image corresponding to the edge amount occupancy level reference selection edge image as the added environmental condition reference selection image from among a plurality of images stored in the image memory unit.

As described above, by selecting an edge amount occupancy level reference selection edge image based on the edge amount occupancy level of a prescribed region in the edge image, and selecting an image corresponding to the edge amount occupancy level reference selection edge image among a plurality of images stored in the image memory unit, a location that is not subject to variations in the added environmental condition can be accurately detected. Consequently, it is possible to accurately select an image with low disturbance among a plurality of images that were taken and acquired by including a common spot.

Here, the edge amount occupancy level reference selection edge image may take the form of selecting a small edge amount edge image as the edge amount occupancy level reference selection edge image in which an edge amount of the prescribed region in the edge image falls below a prescribed occupancy level. Otherwise, the edge amount occupancy level reference selection edge image selection unit may also take the form of selecting a minimal edge amount edge image as the edge amount occupancy level reference selection edge image in which an edge amount of the prescribed region in the edge image becomes minimal.

As described above, by using a small edge amount edge image in which the edge amount of a prescribed region in the edge image falls below a prescribed occupancy level or a minimal edge amount edge image in which the edge amount of a prescribed region in the edge image becomes minimal as the edge amount occupancy level reference selection edge image, an image with even lower disturbance can be selected.

According to the image processing apparatus of the present invention, an image with low disturbance can be selected among a plurality of images that were taken and acquired by including a common spot.

According to the image search apparatus and the image processing apparatus of the present invention, an image that is suitable for use in image processing can be accurately selected among a plurality of images. Moreover, by using this selected image, the processing load upon searching for an image corresponding to the input image can be reduced.

DESCRIPTION OF THE PREFERRED EMBODIMENTS

Figure 1:
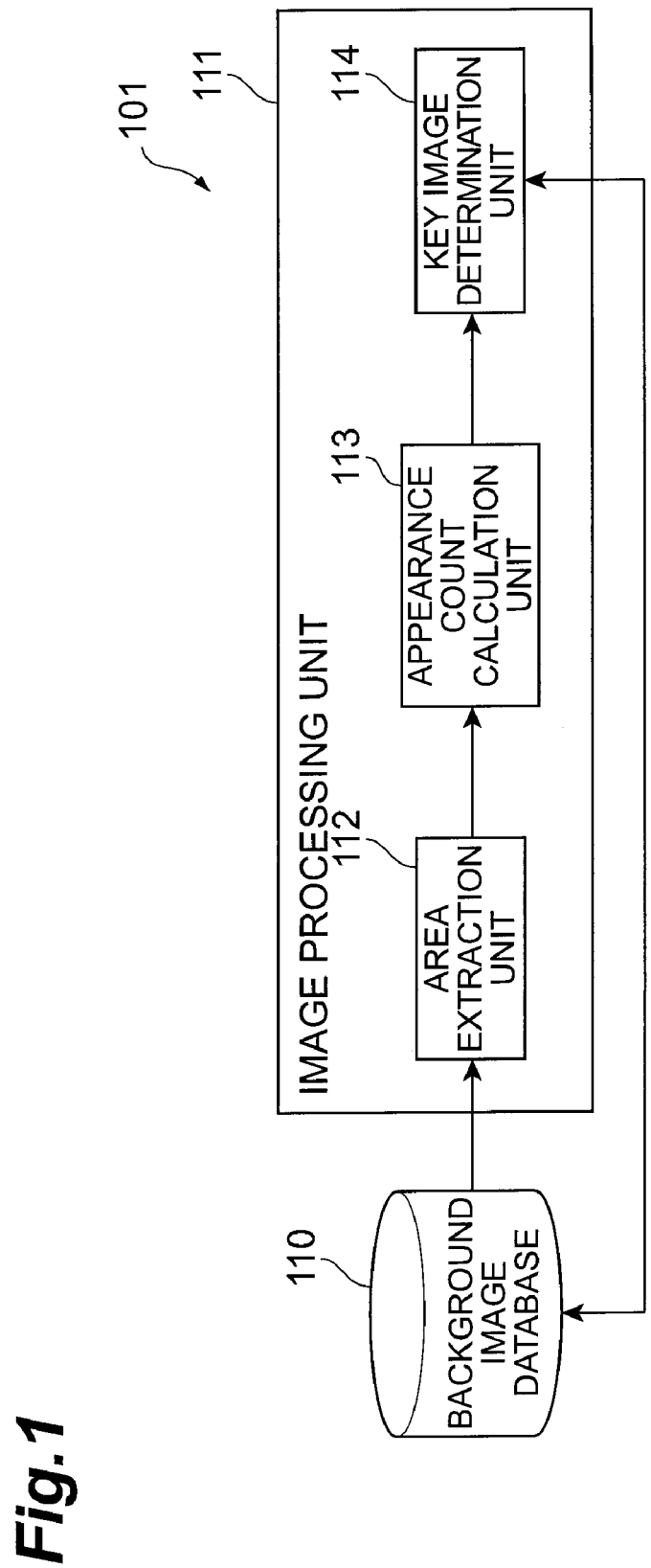
FIG. 1 is a configuration diagram of a key image extraction apparatus according to an embodiment of the present invention.

An embodiment of the image search apparatus according to the present invention is now explained with reference to the attached drawings. Incidentally, the same reference numeral is given to the same element in the description of the drawings, and redundant explanations will be omitted. In addition, for the sake of convenience in illustration, the measurement and proportion of the drawings do not necessarily coincide with the explanation.

In this embodiment, the image search apparatus according to the present invention is applied to an apparatus to be installed in a vehicle. In this embodiment, the image search apparatus is configured from a key image extraction apparatus (corresponds to the characteristic partial image detection unit in the claims) for performing pre processing and a background image search apparatus (corresponds to the search unit in the claims) for performing real time processing while the vehicle is moving or a weather/road surface condition search apparatus. Incidentally, the key image extraction apparatus may be installed in the vehicle together with the background image search apparatus and the weather/road surface condition search apparatus, or configured separately without being installed in the vehicle.

Figure 2:
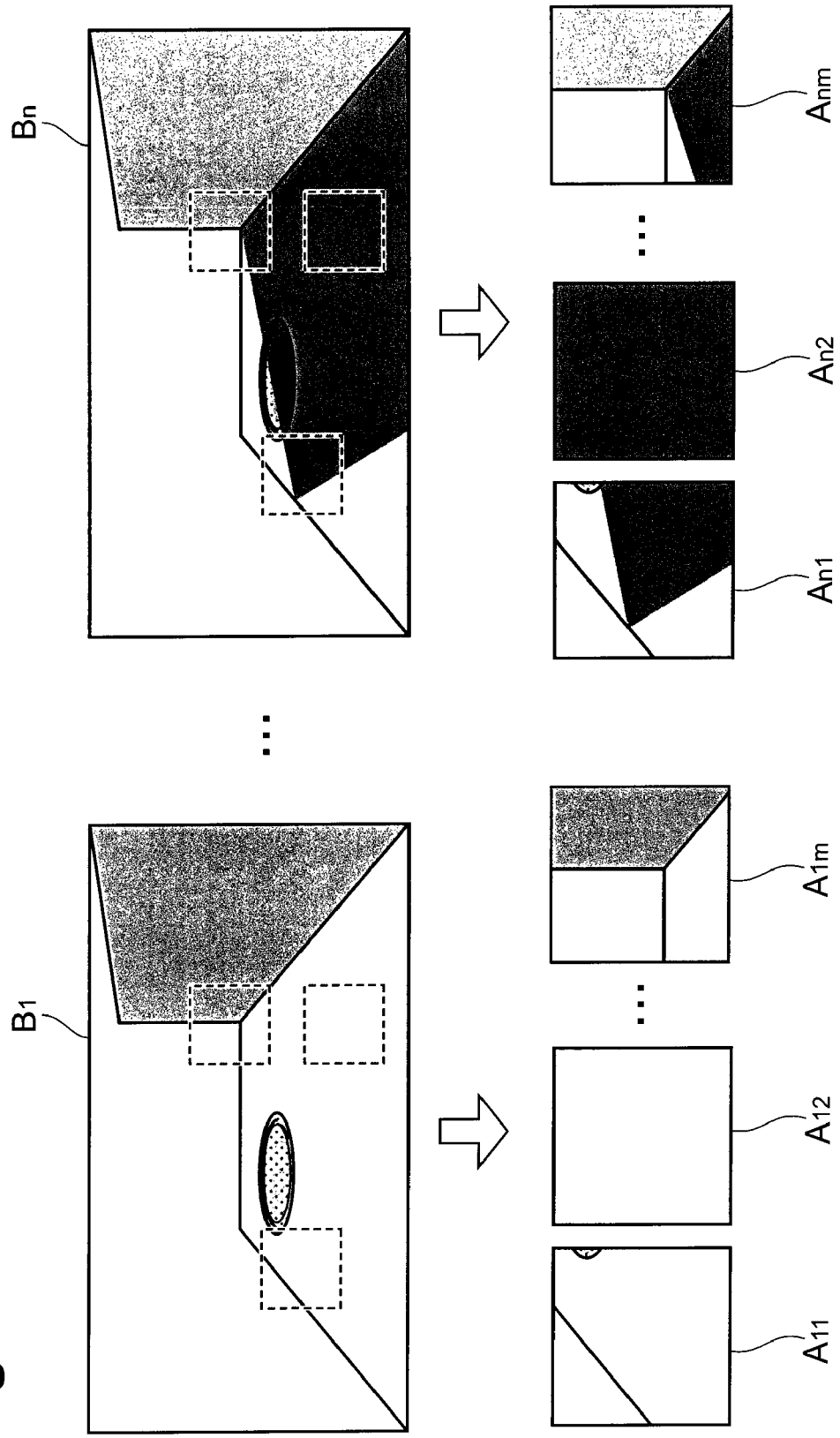
FIG. 2 is an explanatory diagram of processing to be performed by an image processing unit of FIG. 1.

A key image extraction apparatus 101 according to this embodiment is now explained with reference to FIG. 1 and FIG. 2. FIG. 1 is a configuration diagram of the key image extraction apparatus according to this embodiment. FIG. 2 is an explanatory diagram of the processing to be performed by the image processing unit of FIG. 1.

The key image extraction apparatus 101 is an apparatus for extracting a key image upon searching for the background image or weather/road surface condition. The key image extraction apparatus 101 may be configured in a computer such as a personal computer that is installed indoors, or configured as an in-vehicle device. The key image extraction apparatus 101 comprises a background image database 110 and an image processing unit 111 (region extraction unit 112, appearance count calculation unit 113, key image determination unit 114).

Incidentally, in this embodiment, the region extraction unit 112 corresponds to the candidate extraction unit in the claims, the appearance count calculation unit 113 corresponds to the appearance number counting unit in the claims, and the key image determination unit 114 corresponds to the detection unit in the claims.

The background image database 110 is configured in a prescribed region of a hard disk, a RAM or the like. The background image database 110 is a database for storing a plurality of background images taken, for each imaging position, under different conditions from the same imaging position, and data including the date and time of imaging, weather during imaging, road surface condition during imaging and the like that are associated with the respective background images.

The imaging position is each position (corresponds to the current position of the vehicle) upon taking images from an in-vehicle camera while the vehicle is moving. As the imaging position, the current position information based on a GPS (Global Positioning System) receiver installed in the vehicle, or, in the case of vehicles equipped with a navigation system, information such as the current position sought with such navigation system is used.

The background image is a background image taken with an in-vehicle camera while the vehicle is moving (i.e., an image excluding moving objects such as vehicles, bicycles and pedestrians, and objects such as fallen objects that fell from a vehicle and should not normally exist at such location). As the weather during imaging, there is sunny, cloudy, rain, snow and the like. As the road surface condition during imaging, there is dry, wet, icy, snow surface and the like. The plurality of background images taken at the same imaging position are background images taken under environmental conditions of various combinations including the lighting environment (weather, date and time) and road surface environment during the imaging, and are taken at the same imaging position in various combinations of the date and time of imaging, weather during imaging, and road surface condition during imaging.

The image processing unit 111 uses the data stored in the background image database 110 to respectively detect a key image (one or more) to become the search key during the image search for each background image at each imaging position. Thus, the image processing unit 111 includes a region extraction unit 112, an appearance count calculation unit 113 and a key image determination unit 114.

The region extraction unit 112 extracts a region (partial image) that could become a candidate of a key image of each background image for each background image at the same imaging position. As the region to be extracted, it may be a region including a characteristic image in the background image, or a region in which the background image is cut out according to a predetermined mesh. As the extraction method of the characteristic image, for instance, a publicly known characteristic extraction technology such as an edge point detection method may be used.

In the case of the example shown in FIG. 2, there are the images shown with reference numerals $B_1, \ldots, B_n$ as the background images of the same imaging position, and within the background images there is a wall and a sidewalk, a manhole on the sidewalk, and the like. In this example, although there is no shadow in the background image $B_1$, the background image $B_n$ has a shadow of the wall. Regions $A_{11}$, $A_{12}, A_{1m}$ are extracted in the case of the background image $B_1$, and the regions $A_{n1}, A_{n2}, \ldots, A_{nm}$ are extracted in the case of the background image $B_n$.

The appearance count calculation unit 113 counts, for each region (extracted region) that was extracted from each background image, the number of times (appearance count) that a partial image of that region appeared in the other background images. Even with the background images that are taken at the same imaging position, there will be differences in the appearance of shadows if there are differences in the lighting conditions due to the weather during imaging and date and time of imaging. Moreover, even with the background images that are taken at the same imaging position, there will be differences in the color information and brightness information of the image due to the road surface condition. Accordingly, even with the background images that are taken at the same imaging position, they will possess a characteristic partial image that will not appear in the other background images of the same imaging position. Thus, the number of times (appearance count) that a partial image of the extracted region of each background image appeared in the other background images is sought. The fewer the appearance count (that is, the fewer the other background images possessing the same partial image), it will become a characteristic image that appears in that background image.

As the specific processing, the appearance count calculation unit 113 respectively extracts, for each extracted region, a region (partial image) of the same position as the extracted region from a plurality of other background images, and respectively calculates a similarity level of a partial image of the extracted region and a partial image of the region at the same position of each of the other background images. The similarity level shows that, larger the value, the images between the regions are similar, and, for example, a publicly known correlation value obtained by normalized correlation processing between the regions (partial images) may be used.

The appearance count calculation unit 113 extracts, for each extracted region, other background images among a plurality of other background images in which the similarity level between the regions exceeds a threshold value $\alpha 1$, and counts the number of other background images having a threshold value of $\alpha 1$ or higher as the appearance count. The threshold value $\alpha 1$ is a threshold value for determining whether the partial images between the regions are the same image based on the similarity level, and is a predetermined design value.

The key image determination unit 114 determines, for each extracted region of each background image, whether an image will become a key image based on the appearance count in the other background images. The key image is an image to become the search key upon conducting the search, and is an image that enables differentiation from the other background images. Thus, the key image shall be a characteristic image that appears in that background image with low similarity with the other background images, and, in particular, is desirably a characteristic image that only appears in that background image.

As the specific processing, the key image determination unit 114 determines, for each extracted region, whether the appearance count in the other background images falls below a threshold value $\beta 1$, and uses the extracted region in which the appearance count falls below the threshold value $\beta 1$ as the key image of that background image. When the key image determination unit 114 determines to use an extracted region as the key image, it associates that key image with the background image and stores such key image in the background image database 110. The threshold value $\beta 1$ is a threshold value for determining an extracted region with a low appearance count in the other background images, and is a predetermined design value. If the threshold value $\beta 1$ is set to 0, since the partial image of the extracted region in which the appearance count falls below the threshold value $\beta 1$ will not appear in all other background images, it can be determined to be a unique region (key image) that only appears in that background image. As a result of conducting the search using a key image that does not appear in all other background images, a high-precision search is enabled with fewer key images.

One or more key images are selected for a single background image. Fewer the key images, the processing load during the search can be alleviated, and, greater the number of key images, a high-precision search is enabled during the search. The number of key images to be used may be appropriately set in consideration of the processing load and search accuracy.

In the case of the example shown in FIG. 2, since the region $A_{n1}$ of the background image $B_n$ does not appear in the background image $B_1, \ldots$, it becomes a key image.

The key image extraction apparatus 101 outputs to the background image search apparatuses 102, 103 the respective background images for each date and time of imaging stored in the background image database 110 and the key images associated with the background images. Moreover, the key image extraction apparatus 101 outputs to the weather/road surface condition search apparatus 104 the respective combinations of weather during imaging and road surface condition for each date and time of imaging stored in the background image database 110 and the key images associated with the combinations (background images).

Figure 3:
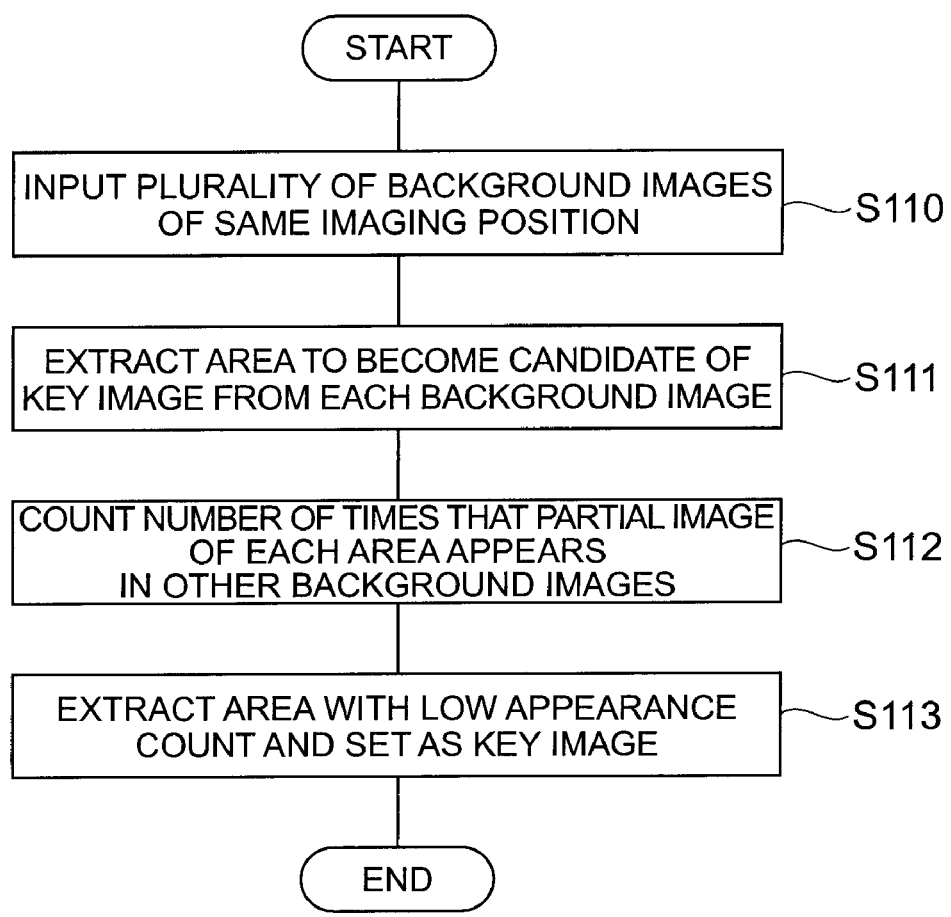
FIG. 3 is a flowchart showing a flow of processing to be performed by the image processing unit of FIG. 1.

The operation of the key image extraction apparatus 101 is now explained with reference to FIG. 1 and FIG. 2. In particular, the processing to be performed by the image processing unit 111 is explained with reference to the flowchart of FIG. 3. FIG. 3 is a flowchart showing the flow of processing to be performed by the image processing unit of FIG. 1.

The background image database 110 stores, for each imaging position, a plurality of background images to which the date and time of imaging, weather during imaging, and road surface condition during imaging are associated.

The image processing unit 111 inputs a plurality of background images of the same imaging position from the background image database 110 (S110).

The image processing unit 111 extracts, for each background image of the same imaging position, a region to become a candidate of a key from the background image (S111). Then, the image processing unit 111 counts, for each extracted region, the number of times that the partial image of that region appears in the other background images (S112).

The image processing unit 111 extracts, for each background image of the same imaging position, a region with a low appearance count (preferably an appearance count of 0) in the other background images, and sets that extracted region as the key image (characteristic partial image that appears in that background image) (S113). Then, the image processing unit 111 associates the set key image with the background image and stores it in the background image database 110.

According to this key image extraction apparatus 101, by setting a region with a low appearance count in the other background images of the same imaging position as the key image, a suitable key image for the image search can be set for each background image. As a result of performing the search using this key image, it is possible to search, with high accuracy, an image that corresponds with the input image among a plurality of background images or from the weather and road surface condition.

Moreover, according to the key image extraction apparatus 101, by determining a similarity level (evaluating dissimilarity) of the regions (partial images) among a plurality of background images of the same imaging position, a key image can be automatically extracted without regard to the input image.

Figure 4:
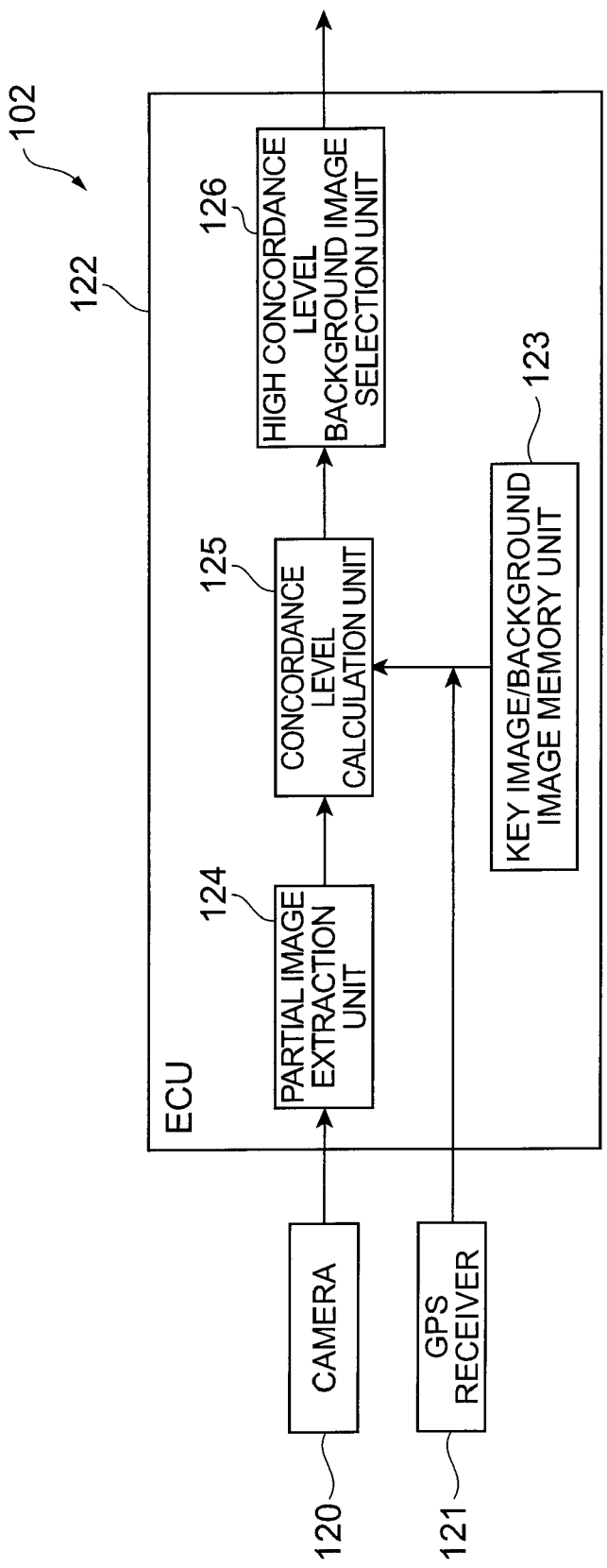
FIG. 4 is a configuration diagram of a background image search apparatus according to the first embodiment.
Figure 5:
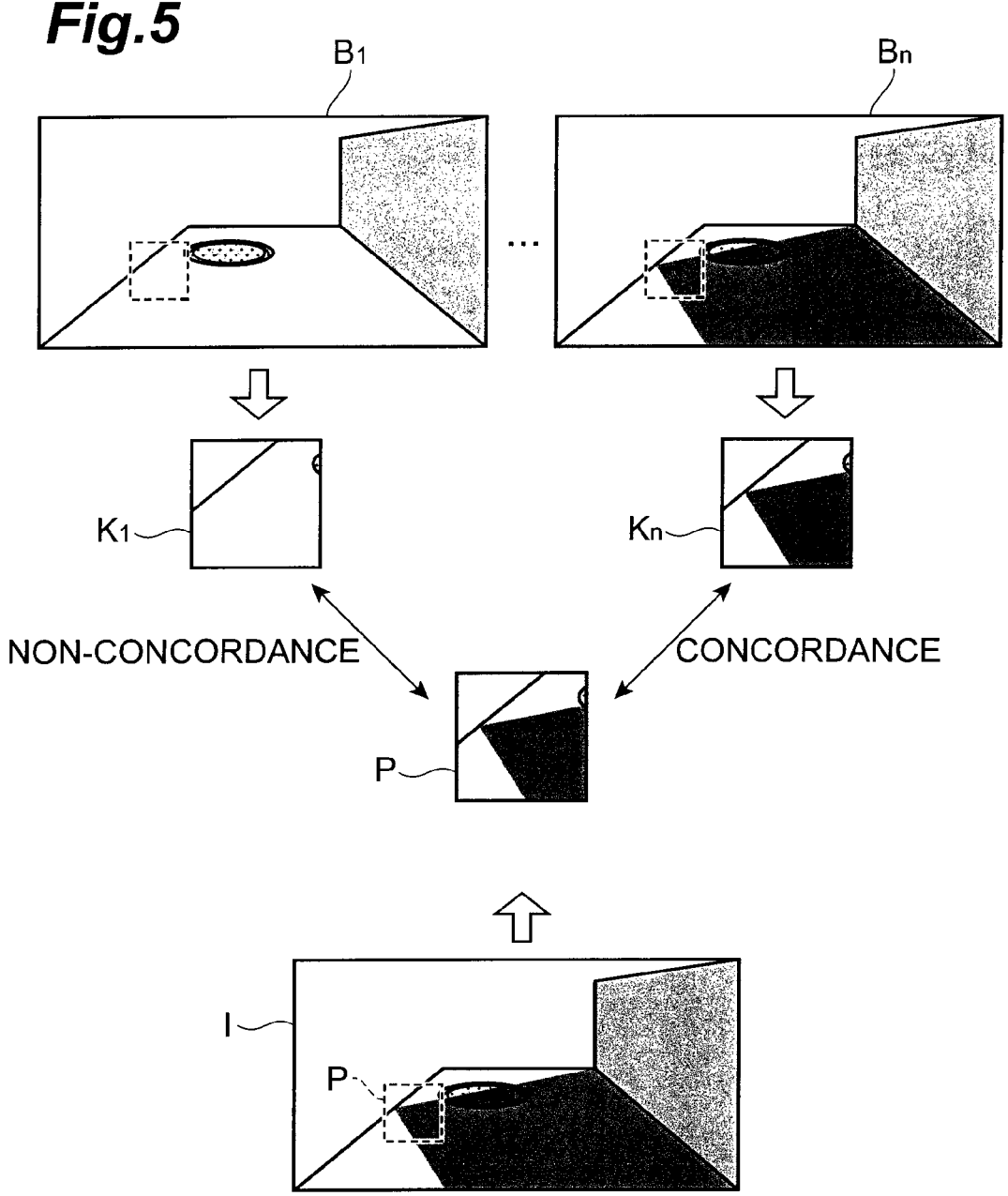
FIG. 5 is an explanatory diagram of processing to be performed by an ECU of FIG. 4.

The background image search apparatus 102 according to the first embodiment is now explained with reference to FIG. 4 and FIG. 5. FIG. 4 is a configuration diagram of the background image search apparatus according to the first embodiment. FIG. 5 is an explanatory diagram of the processing to be performed by the ECU of FIG. 4.

The background image search apparatus 102 is an apparatus for searching a background image having the same lighting environment (weather during imaging, imaging time, and so on) as the input image among a plurality of background images that were taken at the same imaging position as the input image. The background image search apparatus 102 is configured as an in-vehicle apparatus, and outputs the searched background image to an in-vehicle obstacle detection apparatus or the like. The background image search apparatus 102 comprises a camera 120, a GPS receiver 121 and an ECU (Electronic Control Unit) 122.

The camera 120 is a stereo camera such as a CCD (Charge Coupled Device) or a monocular camera. The camera 120 is attached to a prescribed position of the vehicle (position according to the direction in which the obstacle detection and the like is to be performed). The camera 120 takes images in a prescribed direction around the vehicle, and acquires the taken color image (for instance, image based on RGB (Red Green Blue)). The camera 120 sends, for every given period of time, the data of that taken image as an image signal to the ECU 122. Although the camera is color in this embodiment, a monochrome camera may also be used.

The GPS receiver 121 is a device for estimating the current position of a self-vehicle using a GPS. The GPS receiver 121 sends, for every given period of time, a GPS signal from a GPS satellite using a GPS antenna, demodulates the GPS signal, and calculates the current position (latitude, longitude, altitude) of the self-vehicle based on the demodulated position data of the respective GPS satellites. Then, the GPS receiver 121 sends the current position information and the like of the self-vehicle as a GPS detection signal to the ECU 122. Incidentally, as the unit for detecting the current position of the self-vehicle, another unit in a navigation system for detecting the current position may also be used. In addition, the configuration may also be such that the GPS receiver primarily performs only the reception processing of the GPS signal, and the ECU may perform the calculation processing of the current position based on the GPS signal.

The ECU 122 is an electronic control unit configured from a CPU (Central Processing Unit), a ROM (Read Only Memory), a RAM (Random Access Memory) and the like, and governs the overall control of the background image search apparatus 102. The ECU 122 receives, for every given period of time, image signals from the camera 120 and GPS detection signals from the GPS receiver 121. Then, based on the sent image signals and GPS detection signals and data of the key image/background image memory unit 123, the ECU 122 performs processing using the partial image extraction unit 124, the concordance level calculation unit 125, and the high concordance level background image selection unit 126 in order to search for a background image of the same lighting environment as the input image.

The key image/background image memory unit 123 is configured in a prescribed region of the RAM. The key image/background image memory unit 123 stores in advance a plurality of background images for each imaging position and key images associated with the respective background images by using the data that is stored in the background image database 110 of the key image extraction apparatus 101.

The partial image extraction unit 124 extracts, each time a taken image is input from the camera 120, a characteristic partial image of that taken image. As the extraction method of the characteristic partial image, for instance, a publicly known characteristic extraction technology such as an edge point detection method may be used to extract a rectangular region centered around the characteristic point.

In the case of the example shown in FIG. 5, there is an image shown with reference numeral I as the input image, and within the input image I there is a wall and a sidewalk, a manhole on the sidewalk, and the like, and there is also a shadow of the wall. In the case of the input image I, a characteristic partial image P including the edge of the manhole and the corner of the shadow is extracted.

The concordance level calculation unit 125 calculates a concordance level (coincidence level) of the respective key images of a plurality of background images of the same imaging position as the input image stored in the key image/background image memory unit 123, and the characteristic partial image of the input image.

As the specific processing, the concordance level calculation unit 125 extracts a plurality of background images of the same imaging position as the input image and their key images from the key image/background image memory unit 123 based on the current position (corresponds to the imaging position) from the GPS receiver 121. Here, if the key image/background image memory unit 123 does not include any background image that was taken at the same imaging position as the input image, the background image and its key image that is the most approximate to the input image is extracted, and either the input image or the background image and its key image is subject to image conversion based on the relative difference of that imaging position and used as the equivalent of the image of the same imaging position.

The concordance level calculation unit 125 calculates the concordance level with the characteristic partial image of the input image for each key image of each of the extracted background images. The concordance level shows that, larger the value, the partial image of the input image and the key image coincide, and, for example, a publicly known correlation value obtained by normalized correlation processing for evaluating the similarity level may be used.

In the case of the example shown in FIG. 5, there are the images shown with reference numerals $B_1, \ldots, B_n$ as the background images of the same imaging position as the input image I. The background image $B_1$ has a key image $K_1$ including the edge of the manhole, and the concordance level of the partial image P and the key image $K_1$ is calculated. The background image $B_n$ has a key image $K_n$ including the edge of the manhole and the corner of the shadow, and the concordance level of the partial image P and the key image $K_n$ is calculated.

The high concordance level background image selection unit 126 selects a background image with a key image having a high concordance level (that is, a background image taken in a similar lighting environment as the input image) based on the concordance level of each key of a plurality of background images of the same imaging position as the input image, and the characteristic partial image of the input image.

As the specific processing, the high concordance level background image selection unit 126 determines, for each key image of each background image, whether the concordance level of with the partial image of the input image exceeds a threshold value $\alpha 2$. The threshold value $\alpha 2$ is a threshold value for determining whether the partial image of the input image and the key image are the same image based on the concordance level, and is a predetermined design value.

Then, the high concordance level background image selection unit 126 determines, for each background image, whether the number of key images, in which the concordance level with the partial image of the input image was determined to exceed the threshold value $\alpha 2$, exceeds a threshold value $\beta 2$, and selects a background image in which the number of key images exceeds the threshold value $\beta 2$. The threshold value $\beta 2$ is a threshold value for determining whether the image is a background image that was taken in the same lighting environment as the input image, and is a predetermined design value. The threshold value $\beta 2$ is set according to the number of key images in the background image.

Here, one or more background images are selected as the background images that were taken in the same lighting environment as the input image. Even when a plurality of background images are selected, a single appropriate background image is selected in the post processing apparatus such as the obstacle detection apparatus or the like.

Incidentally, when narrowing down the plurality of background images to a single background image, the background image with the highest concordance level may be selected, or the background image with the most number of key images in which the concordance level exceed the threshold value $\alpha 2$ may be selected. In addition, if only one key is associated with each background image, the background image with the highest concordance level may be selected without performing the determination based on the threshold value $\alpha 2$ or the threshold value $\beta 2$.

In the case of the example shown in FIG. 5, the concordance level of the key image $K_n$ of the background image $B_n$ and the partial image P of the input image I is high, and the background image $B_n$ with the key image $K_n$ is selected as the background image of the input image I.

Figure 6:
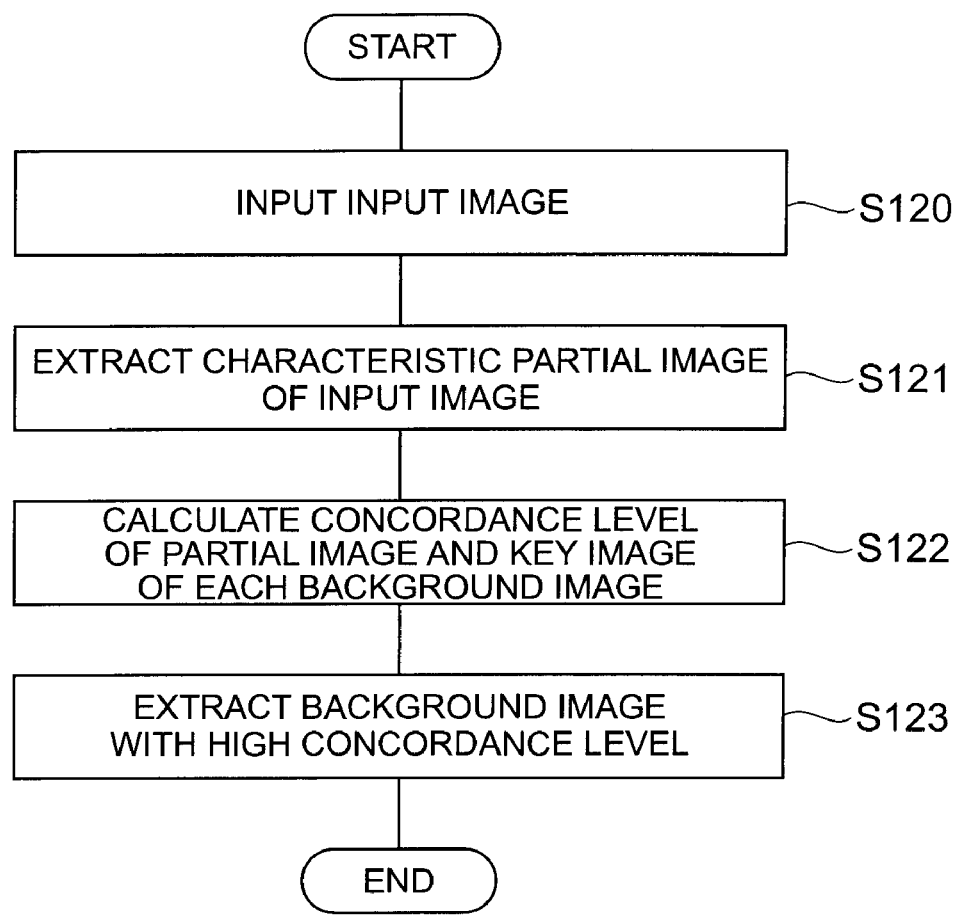
FIG. 6 is a flowchart showing a flow of processing to be performed by the ECU of FIG. 4.

The operation of the background image search apparatus 102 is now explained with reference to FIG. 4 and FIG. 5. In particular, the processing to be performed by the ECU 122 is explained with reference to the flowchart of FIG. 6. FIG. 6 is a flowchart showing the flow of processing to be performed by the ECU of FIG. 4.

The key image/background image memory unit 123 of the ECU 122 stores in advance a plurality of background images and their key images taken in different lighting environments for each imaging position by using the background image database 110 of the key image extraction apparatus 101.

The camera 120 takes an image around the vehicle for every given period of time, and sends the taken image as an image signal to the ECU 122. The ECU 122 receives the image signal for every given period of time, and inputs the input image (S120).

The GPS receiver 121 receives, for every given period of time, a GPS signal from a GPS satellite using a GPS antenna, and calculates the current position (latitude, longitude, altitude) of the self-vehicle based on the respective GPS signals. Then, the GPS receiver 121 sends the current position information and the like of the self-vehicle as a GPS detection signal to the ECU 122. The ECU 122 receives the GPS detection signal and acquires the current position (corresponds to the imaging position) for every given period of time.

Each time an input image is input, the ECU 122 extracts a characteristic partial image from the input image (S121). The ECU 122 extracts a plurality of background images and their key images of the same imaging position as the input image from the key image/background image memory unit 123, and respectively calculates the concordance level of the respective images of the plurality of background images and the partial image of the input image (S122). Moreover, the ECU 122 extracts a background image with a high concordance level among the plurality of background images (that is, a background image that was taken in the same lighting environment as the input image) based on the concordance level of the respective key images of the plurality of background images (S123). The ECU 122 provides the extracted background image to the post processing obstacle detection apparatus.

According to the background image search apparatus 102, by performing a background image search using a key image that is preliminarily extracted with the key image extraction apparatus 101, the processing load after inputting the input image can be alleviated, and the search can be conducted in real time each time the input image is input. Consequently, it is possible to deal with obstacle detection and the like that require real time performance.

Figure 7:
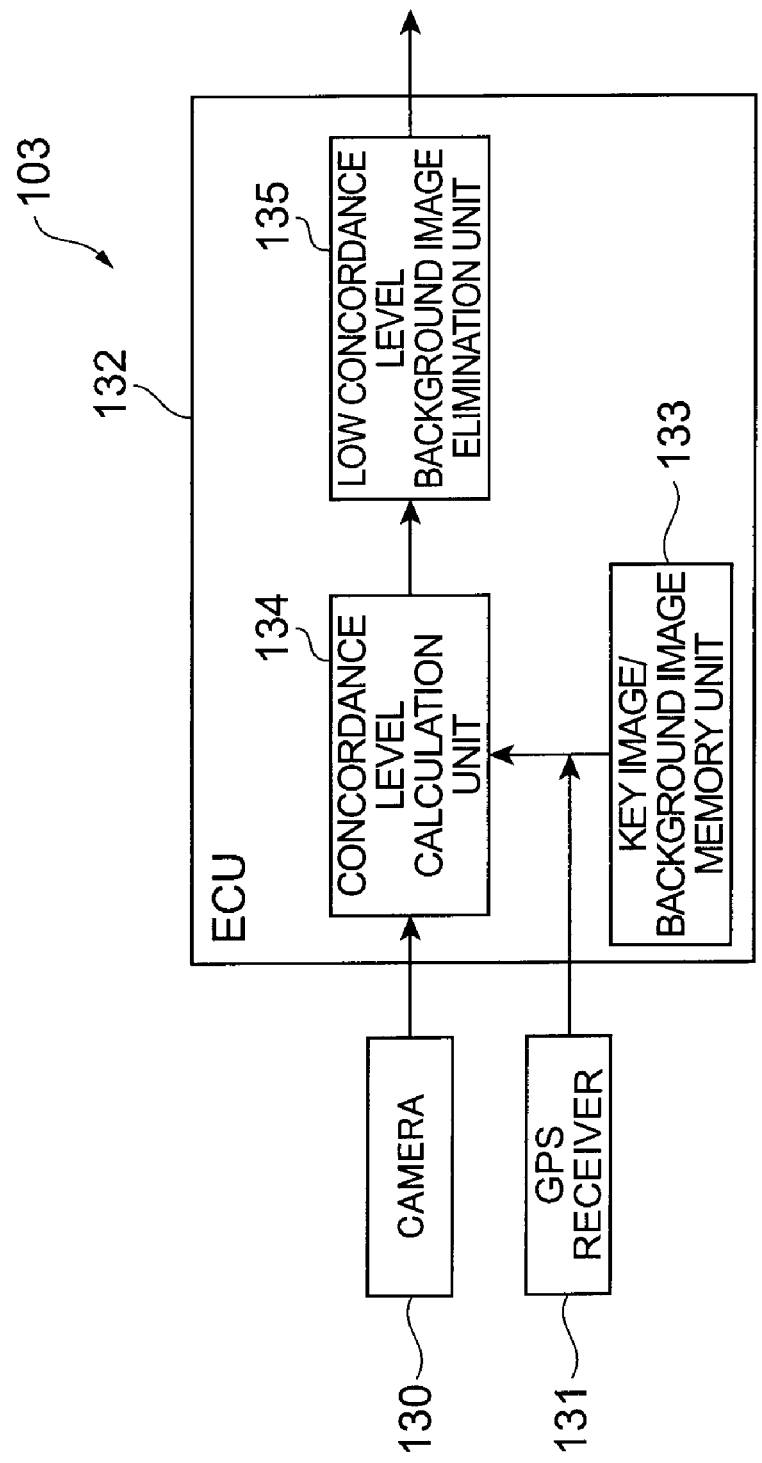
FIG. 7 is a configuration diagram of a background image search apparatus according to the second embodiment.
Figure 8:
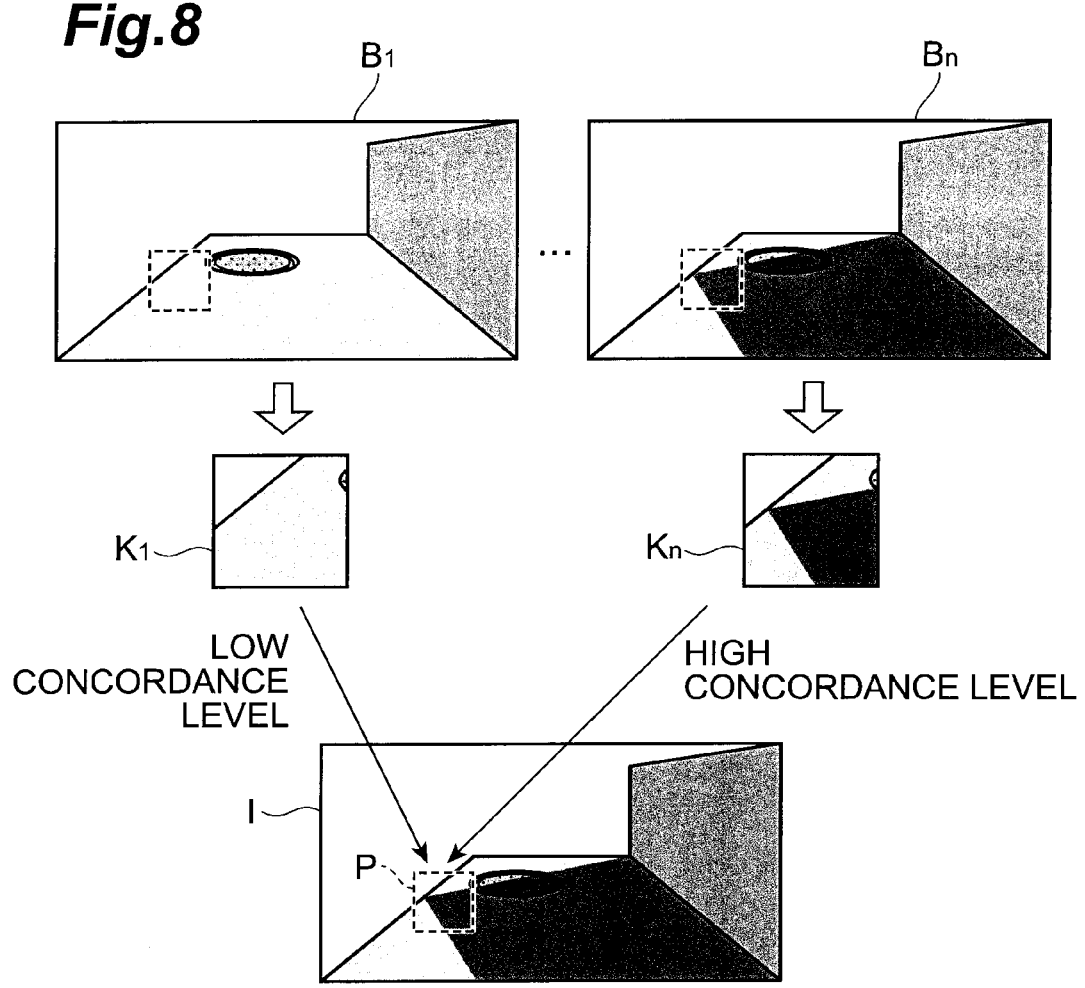
FIG. 8 is an explanatory diagram of processing to be performed by an ECU of FIG. 7.

The background image search apparatus 103 according to the second embodiment is now explained with reference to FIG. 7 and FIG. 8. FIG. 7 is a configuration diagram of the background image search apparatus according to the second embodiment. FIG. 8 is an explanatory diagram of the processing to be performed by the ECU of FIG. 7.

The background image search apparatus 103 is an apparatus that is similar to the background image search apparatus 102 according to the first embodiment, but is able to search for the background image more efficiently than the background image search apparatus 102. Although the background image search apparatus 102 conducted the search based on the characteristic partial image of the input image, the background image search apparatus 103 conducts the search based on the key image of the respective background images. The background image search apparatus 103 comprises a camera 130, a GPS receiver 131 and an ECU 132. Incidentally, the camera 130 and the GPS receiver 131 are configured the same as the camera 120 and the GPS receiver 121 of the background image search apparatus 102 according to the first embodiment, and the explanation thereof is omitted.

The ECU 132 is an electronic control unit configured from a CPU, a ROM, a RAM and the like, and governs the overall control of the background image search apparatus 103. The ECU 132 receives, for every given period of time, image signals from the camera 130 and GPS detection signals from the GPS receiver 131. Then, based on the sent image signals and GPS detection signals and data of the key image/background image memory unit 133, the ECU 132 performs processing using the concordance level calculation unit 134 and the low concordance level background image elimination unit 135 in order to search for a background image of the same lighting environment as the input image. Incidentally, the key image/background image memory unit 133 is configured the same as the key image/background image memory unit 123 of the ECU 122 according to the first embodiment, and the explanation thereof is omitted.

The concordance level calculation unit 134 calculates, each time a taken image is input from the computer 130, a concordance level (coincidence level) of the respective key images of a plurality of background images of the same imaging position as the input image stored in the key image/background image memory unit 133, and the partial image of the region of a position that corresponds with the key image in such input image.

As the specific processing, the concordance level calculation unit 134 extracts a plurality of background images of the same imaging position as the input image and their key images from the key image/background image memory unit 133 based on the current position from the GPS receiver 131. Here, if the key image/background image memory unit 133 does not include any background image that was taken at the same imaging position as the input image, as with the ECU 122 according to the first embodiment, either the input image or the background image and its key image is subject to image conversion.

The concordance level calculation unit 134 extracts, for each key image of each of the extracted background images, a region of the same position as the key image from the input image, and calculates the concordance level of the partial image of the extracted region and the key image. The concordance level is the same as the concordance level in the ECU 122 according to the first embodiment.

In the case of the example shown in FIG. 8, there are the images shown with reference numerals $B_1, \ldots, B_n$ as the background images of the same imaging position as the input image I, and the background images include a wall and a sidewalk, and a manhole on the sidewalk. The background image $B_1$ has a key image $K_1$ including the edge of the manhole, and the concordance level of the partial image P of the region of the same position as the key image $K_1$ in the input image I and the key image $K_1$ is calculated. The background image $B_n$ has a key image $K_n$ including the edge of the manhole and the corner of the shadow, and the concordance level of the partial image P of the region of the same position as the key image $K_n$ in the input image I and the key image $K_n$ is calculated.

The low concordance level background image elimination unit 135 eliminates a background image with a key image having a low concordance level (that is, a background image taken in a different lighting environment than the input image) based on the concordance level of the respective key images of the plurality of background images of the same imaging position as the input image and the partial image of the same position in the input image, and ultimately leaves behind a background image that was taken in a lighting environment that is similar to the input image.

As the specific processing, the low concordance level background image elimination unit 135 determines, for each key image of each background image, whether the concordance level with the partial image of the input image is not less than a threshold value $\alpha3$. The threshold value $\alpha3$ is a threshold value for determining whether the key image and the partial image of the input image are the same image based on the concordance level, and is a predetermined design value.

Then, the low concordance level background image elimination unit 135 determines, for each background image, whether the number of key images, in which the concordance level with the partial image of the input image was determined to be not less than the threshold value $\alpha3$, is not more than a threshold value $\beta3$, and eliminates the background images in which the number of key images falls not more than the threshold value $\beta3$. The threshold value $\beta3$ is a threshold value for determining whether the image is a background image that was taken in a different lighting environment as the input image, and is a predetermined design value. The threshold value $\beta3$ is set according to the number of key images in the background image.

When the background images having a low concordance level are eliminated from the plurality of background images of the same imaging position as the input image, the background images taken in a lighting environment that is similar to the input image will remain. Here, if there are many remaining background images, the value of the threshold value $\beta3$ is tightened (value of $\beta3$ is increased) to further eliminate the background images among the remaining background images and narrow down the background images of a high concordance level.

Incidentally, instead of eliminating the background images having a low concordance level, the background images having a high concordance level may be selected. In the foregoing case, the background images are selected in which the number of key images, wherewith the concordance level with the partial image of the input image was determined to exceed the threshold value $\alpha3$, exceeds a threshold value $\beta3'$.

In the case of the example shown in FIG. 8, the concordance level of the key image $K_1$ of the background image $B_1$ and the partial image P of the input image I is low, and the background image $B_1$ and the like are eliminated, and the background image $B_n$ remains.

Figure 9:
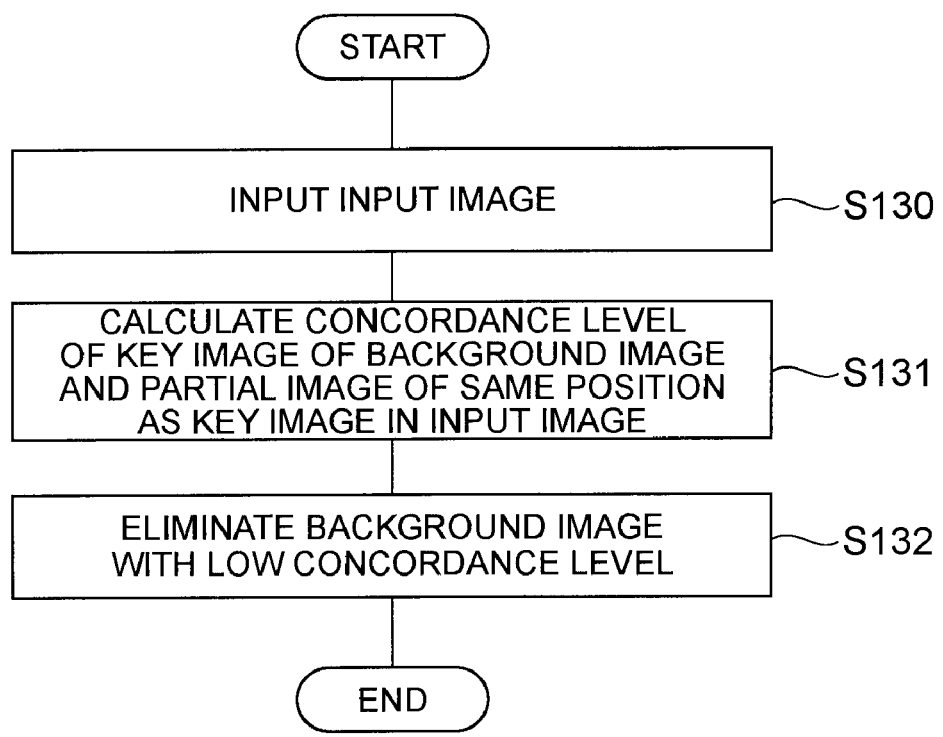
FIG. 9 is a flowchart showing a flow of processing to be performed by the ECU of FIG. 7.

The operation of the background image search apparatus 103 is now explained with reference to FIG. 7 and FIG. 8. In particular, the processing to be performed by the ECU 132 is explained with reference to the flowchart of FIG. 9. FIG. 9 is a flowchart showing the flow of processing to be performed by the ECU of FIG. 7.

The key image/background image memory unit 133 of the ECU 132 stores in advance a plurality of background images and their key images taken in different lighting environments for each imaging position by using the background image database 110 of the key image extraction apparatus 101.

The camera 130 takes an image around the vehicle for every given period of time, and sends the taken image as an image signal to the ECU 132. The ECU 132 receives the image signal for every given period of time, and inputs the input image (S130).

The GPS receiver 131 receives, for every given period of time, a GPS signal from a GPS satellite using a GPS antenna, and calculates the current position (latitude, longitude, altitude) of the self-vehicle based on the respective GPS signals. Then, the GPS receiver 131 sends the current position information and the like of the self-vehicle as a GPS detection signal to the ECU 132. The ECU 132 receives the GPS detection signal and acquires the current position (corresponds to the imaging position) for every given period of time.

Each time an input image is input, the ECU 132 extracts a plurality of background images and their key images of the same imaging position as the input image from the key image/background image memory unit 133, and respectively calculates the concordance level of the respective key images of the plurality of background images and the partial image of a region at the same position as the key image in the input image (S131). In addition, based on the concordance level with the respective key images of the plurality of background images, the ECU 132 eliminates the background images having a low concordance level among the plurality of background images (background images that were taken in a different lighting environment than the input image), and leaves behind the background images that were taken in the same lighting environment as the input image (S132). Then, the ECU 132 provides the remaining background images to the post processing obstacle detection apparatus or the like.

According to the background image search apparatus 103, in addition to yielding the same effect as the background image search apparatus 102 according to the first embodiment, it also yields the following effects. According to the background image search apparatus 103, the processing load can be alleviated and a highly efficient search can be conducted since the search is performed by calculating the concordance level of only the key image in the input image and the partial image of the same position based on the key images of the background images that were taken in various lighting environments.

Figure 10:
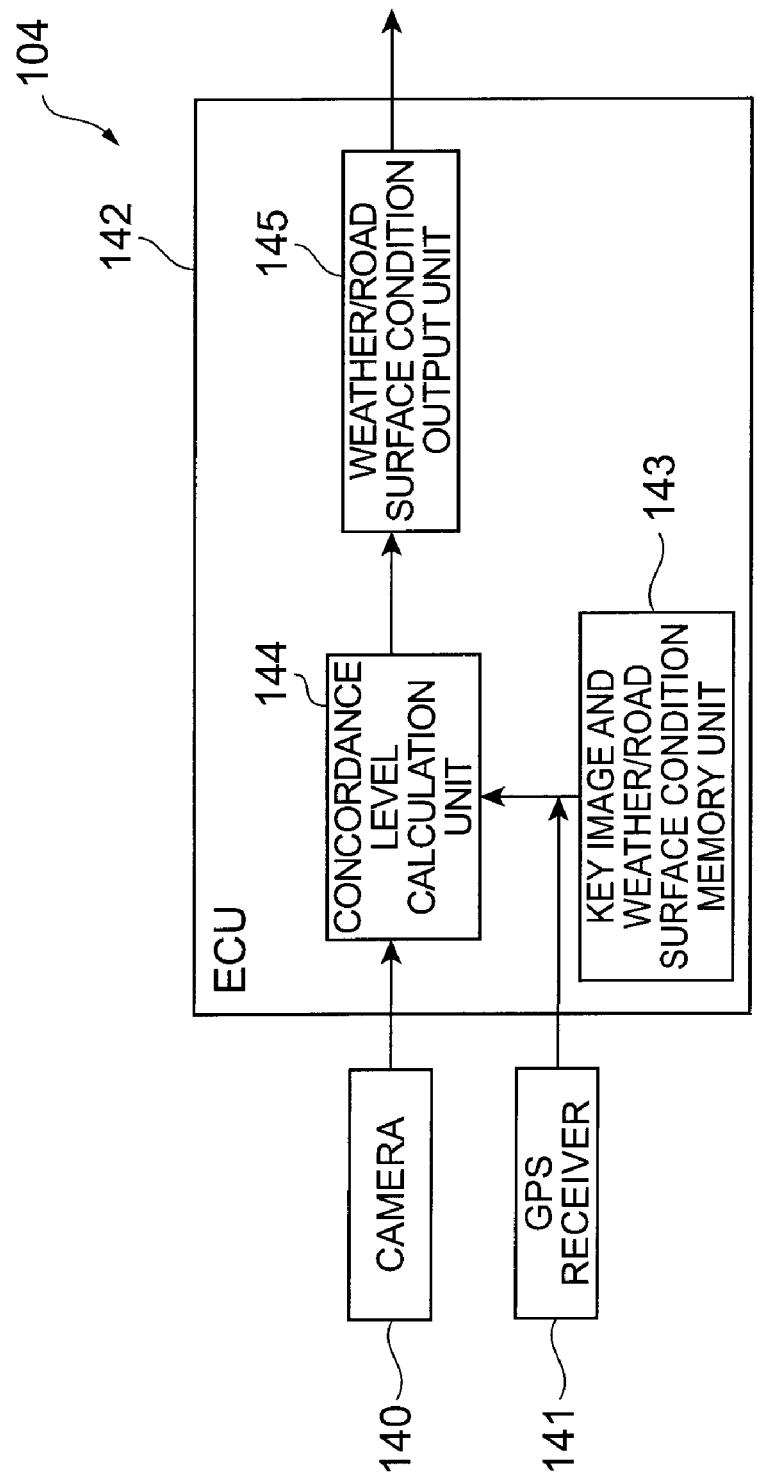
FIG. 10 is a configuration diagram of a weather/road surface condition search apparatus according to an embodiment of the present invention.
Figure 11:
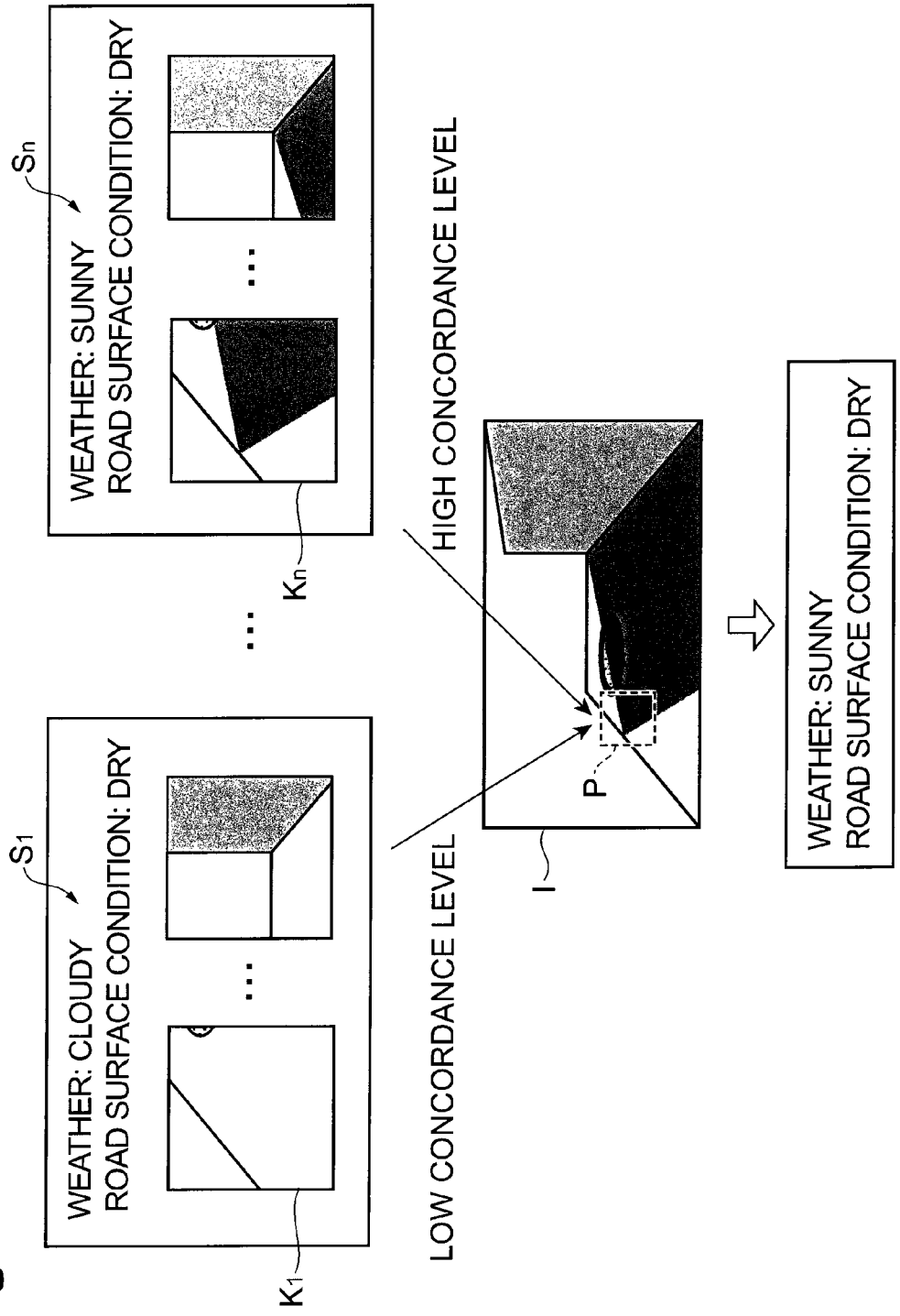
FIG. 11 is an explanatory diagram of processing to be performed by an ECU of FIG. 10.

The weather/road surface condition search apparatus 104 according to this embodiment is now explained with reference to FIG. 10 and FIG. 11. FIG. 10 is a configuration diagram of the weather/road surface condition search apparatus according to this embodiment. FIG. 11 is an explanatory diagram of the processing to be performed by the ECU of FIG. 10.

The weather/road surface condition search apparatus 104 is an apparatus for searching for the combination of weather and road surface condition that is the same as the input image among the combinations of weather and road surface condition upon taking a plurality of background images based on the key images of the plurality of background images of the same imaging position as the input image. The weather/road surface condition search apparatus 104 is configured as an in-vehicle apparatus, and outputs the searched and weather and road surface condition to the various vehicle control apparatuses (for example, an anti-lock brake apparatus, traction control apparatus, or automatic operation apparatus) or a warning apparatus based on the weather or road surface condition. The weather/road surface condition search apparatus 104 comprises a camera 140, a GPS receiver 141 and an ECU 142. Incidentally, the camera 140 and the GPS receiver 141 are configured the same as the camera 120 and the GPS receiver 121 of the background image search apparatus 102 according to the first embodiment, and the explanation thereof is omitted.

The ECU 142 is an electronic control unit configured from a CPU, a ROM, a RAM and the like, and governs the overall control of the weather/road surface condition search apparatus 104. The ECU 142 receives, for every given period of time, image signals from the camera 140 and GPS detection signals from the GPS receiver 141. Then, based on the sent image signals and GPS detection signals and the data of the key image and weather/road surface condition memory unit 143, the ECU 142 performs processing using the concordance level calculation unit 144 and the weather/road surface condition output unit 145, and searches for the same weather and road surface condition as the input image, The key image and weather/road surface condition memory unit 143 is configured in a prescribed region of the RAM. The key image and weather/road surface condition memory unit 143 stores in advance the weather during imaging, road surface condition during imaging and key image associated with a plurality of background images for each imaging position by using the data stored in the background image database 110 of the key image extraction apparatus 101. In other words, the key images are stored by being associated with various combinations of weather during imaging and the road surface condition.

Each time a taken image is input from the camera 140, the concordance level calculation unit 144 calculates a concordance level (coincidence level) of the respective key images regarding a plurality of combinations of weather during imaging and road surface condition of the same imaging position as the input image that is stored in the key image and weather/road surface condition memory unit 143, and the partial image of a region of the position corresponding with that key image in the input image.

As the specific processing, the concordance level calculation unit 144 extracts, based on the current position from the GPS receiver 141, a plurality of combinations of weather during imaging and road surface condition and their key images of the same imaging position as the input image from the key image and weather/road surface condition memory unit 143. Here, if the key image and weather/road surface condition memory unit 143 does not include any background image that was taken at the same imaging position as the input image, as with the ECU 122 according to the first embodiment, either the input image or the background image and its key image is subject to image conversion.

The concordance level calculation unit 144 extracts, for each key image of each of the extracted combinations, a region of the same position as the key image from the input image, and calculates the concordance level of the partial image of the extracted region and the key image. The concordance level is the same as the concordance level in the ECU 122 according to the first embodiment.

In the case of the example shown in FIG. 11, there are the images shown with reference numerals $S_1, \ldots, S_n$ as the combinations of the weather during imaging and road surface condition of the same imaging position as the input image I. In the combination $S_1$, the weather is cloudy and the road surface condition is dry, it has a key image $K_1$ including the edge of the manhole, and the concordance level of the partial image P of the region of the same position as the key image $K_1$ in the input image I and the key image $K_1$ is calculated. In the combination $S_n$, the weather is sunny and the road surface condition is dry, and it has a key image $K_n$ including the edge of the manhole and the corner of the shadow, and the concordance level of the partial image P of the region of the same position as the key image $K_n$ in the input image I and the key image $K_n$ is calculated.

The weather/road surface condition output unit 145 selects the combination of weather during imaging and road surface condition with a high concordance level (that is, the weather and road surface condition that are the same as the time that the input image was taken) based on the concordance level of the respective key images regarding a plurality of combinations of weather during imaging and road surface condition of the same imaging position as the input image, and the partial image of the same position as the key images in the input image.

As the specific processing, the weather/road surface condition output unit 145 determines, for each key image of each combination, whether the concordance level with the partial image of the input image exceeds a threshold value α4. The threshold value α4 is a threshold value for determining whether the key image and the partial image of the input image are the same image based on the concordance level, and is a predetermined design value.

Then, the weather/road surface condition output unit 145 determines, for each combination, whether the number of key images, in which the concordance level with the partial image of the input image was determined to exceed the threshold value α4, exceeds a threshold value β4, and selects combinations in which the number of key images exceeds the threshold value β4. The threshold value β4 is a threshold value for determining whether the weather and road surface condition are the same as at the time that the input image was taken, and is a predetermined design value. The threshold value β4 is set according to the number of key images in the background image.

Here, one or more combinations are selected as the combinations of weather and road surface condition that are the same as the time that the input image was taken. Even when a plurality of combinations are selected, a single appropriate combination is selected in the post processing apparatus such as the obstacle detection apparatus or the like.

Incidentally, when narrowing down the plurality of combinations to a single combination, the combination with the highest concordance level may be selected, or the combination with the most number of key images in which the concordance level exceed the threshold value α4 may be selected. In addition, if only one key is associated with each combination, the combination with the highest concordance level may be selected without performing the determination based on the threshold value α4 or the threshold value β4.

In the case of the example shown in FIG. 11, the concordance level of the key image $K_n$ of the combination $S_n$ and the partial image P of the input image I is high, and the combination $S_n$ is selected as the combination of weather and road surface condition (weather is sunny and road surface condition is dry) that is the same as the time that the input image I was taken.

Figure 12:
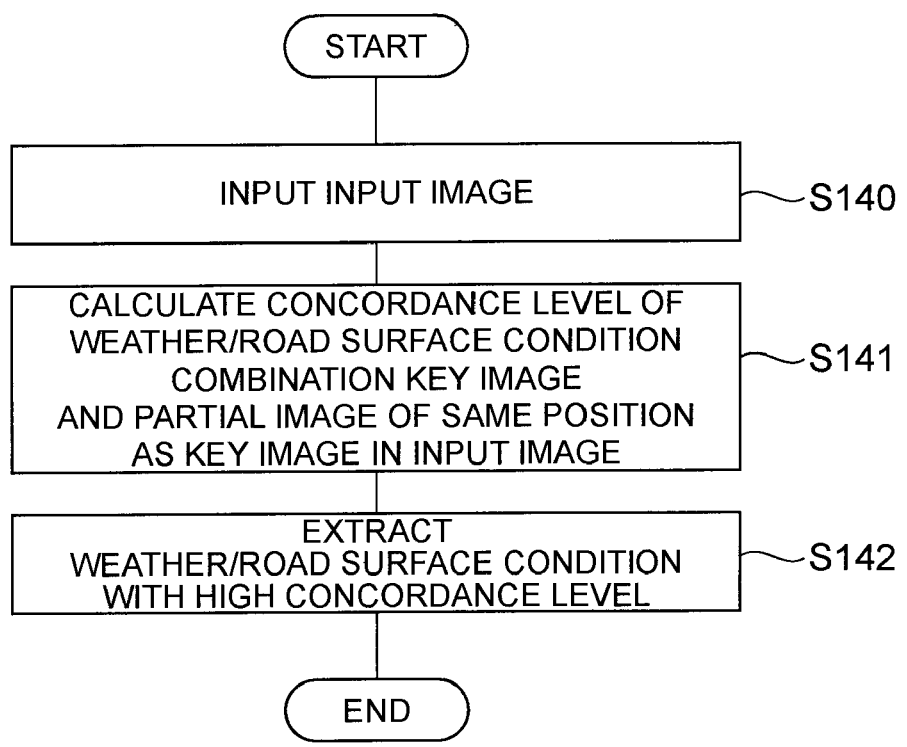
FIG. 12 is a flowchart showing a flow of processing to be performed by the ECU of FIG. 10.

The operation of the weather/road surface condition search apparatus 104 is now explained with reference to FIG. 10 and FIG. 11. In particular, the processing to be performed by the ECU 142 is explained with reference to the flowchart of FIG. 12. FIG. 12 is a flowchart showing the flow of processing to be performed by the ECU of FIG. 10.

The key image and weather/road surface condition memory unit 143 of the ECU 142 stores in advance a plurality of combinations of weather during imaging and road surface condition for each imaging position by using the background image database 110 of the key image extraction apparatus 101.

The camera 140 takes an image around the vehicle for every given period of time, and sends the taken image as an image signal to the ECU 142. The ECU 142 receives the image signal for every given period of time, and inputs the input image (S140).

The GPS receiver 141 receives, for every given period of time, a GPS signal from a GPS satellite using a GPS antenna, and calculates the current position (latitude, longitude, altitude) of the self-vehicle based on the respective GPS signals. Then, the GPS receiver 141 sends the current position information and the like of the self-vehicle as a GPS detection signal to the ECU 142. The ECU 142 receives the GPS detection signal and acquires the current position (corresponds to the imaging position) for every given period of time.

Each time an input image is input, the ECU 142 extracts a plurality of combinations of weather during imaging and road surface condition and their key images of the same imaging position as the input image from the key image and weather/road surface condition memory unit 143, and respectively calculates the concordance level of the respective key images of the plurality of combinations and the partial image of a region at the same position as the key image in the input image (S141). In addition, based on the concordance level with the respective key images of the plurality of combinations, the ECU 142 extracts a combination of weather and road surface condition having a high concordance level among the plurality of combinations (same weather and road surface condition as the time that the input image was taken) (S142). Then, the ECU 142 provides the extracted combination of weather and road surface condition to the post processing vehicle control apparatus or the like.

According to the weather/road surface condition search apparatus 104, by searching for the weather and road surface condition using the key images that are preliminarily extracted with the key image extraction apparatus 101, the processing load after inputting the input image can be alleviated, and the search can be conducted in real time each time the input image is input. Consequently, it is possible to deal with vehicle control and the like that require real time performance. Moreover, according to the weather/road surface condition search apparatus 104, since the search is conducted by calculating the concordance level of only the key image in the input image and the partial image of the same position based on the key images that were taken in various types of weather and road surface conditions, it is possible to alleviate the processing load and conduct a highly efficient search.

Although an embodiment of the present invention was described above, the present invention is not limited to the foregoing embodiment and may be implemented in various modes.

For instance, although this embodiment explained a case of applying the present invention to an in-vehicle apparatus, the present invention can also be applied to other uses such as a security camera.

Moreover, although this embodiment applied the present invention to an apparatus for searching a background image to be taken from an in-vehicle camera as the search-target image, the present invention can also be applied to an apparatus in which other images are used as the search-target image.

Further, although this embodiment applied the present invention to an apparatus for searching both the weather and road surface condition, the present invention may also be applied to an apparatus for searching either the weather or the road surface condition.

The image processing apparatus according to an embodiment of the present invention is now explained.

Figure 13:
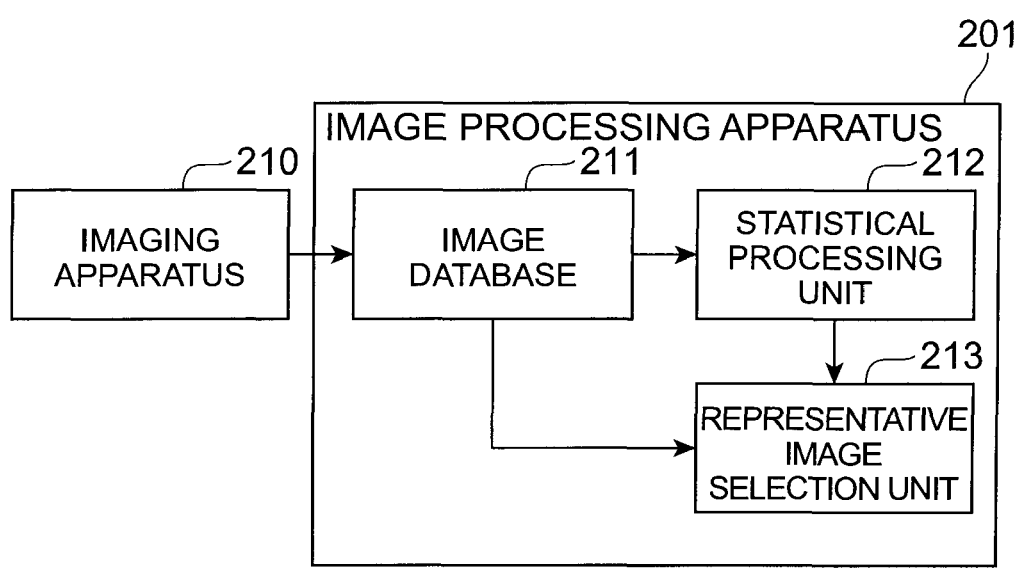
FIG. 13 is a block configuration diagram of an image processing apparatus according to the third embodiment.

FIG. 13 is a block configuration diagram of the image processing apparatus according to the third embodiment of the present invention. As shown in FIG. 13, the image processing apparatus 201 of this embodiment comprises an image database 211, a statistical processing unit 212, and a representative image selection unit 213. Further, an imaging apparatus 210 is connected to the image processing apparatus 201. The imaging apparatus 210 is fixed, for example, to a fixed point outdoors, and takes images of the same location. The imaging apparatus 210 sends the taken image to the image processing apparatus 201.

The image processing apparatus 201 is configured from a CPU that performs arithmetic processing, a ROM and a RAM configured from a memory unit, an input signal circuit, an output signal circuit, a power source circuit and the like. The image processing apparatus 201 stores the images sent from the imaging apparatus 210 in the image database 211. The imaging apparatus 210 sends a background image for every given period of time, and the image database 211 stores a plurality of background images in which images of the same location were taken. Moreover, a statistical processing unit 212 is connected to the image database 211.

The statistical processing unit 212 reads the plurality of background images stored in the image database 211, and performs statistical processing to the plurality of background images. The statistical processing unit 212 outputs statistical processing information concerning the statistical processing result to a representative image selection unit 213. The representative image selection unit 213 selects a representative image among the plurality of background images stored in the image database 211 based on the statistical processing result that is output from the statistical processing unit 212.

The processing routine of the image processing apparatus according to this embodiment is now explained. The image processing apparatus 201 of this embodiment performs processing of selecting an image that is suitable for subsequent image processing among a plurality of images that were taken and acquired by including a common spot under a plurality of different environmental conditions. An image this is suitable for subsequent image processing is considered to be an image that is least affected by the environmental conditions in the image.

Right now, the imaging apparatus 210 is taking images of the same spot. Although the background of the images taken in the same spot is the same, the environmental conditions such as the time period, weather, lighting and the like will differ. Thus, a plurality of images taken under different environmental conditions are sent to the image processing apparatus 201. The image processing apparatus 201 performs the processing of selecting an image that is suitable for subsequent image processing among the plurality of images that were taken under different environmental conditions.

Figure 14:
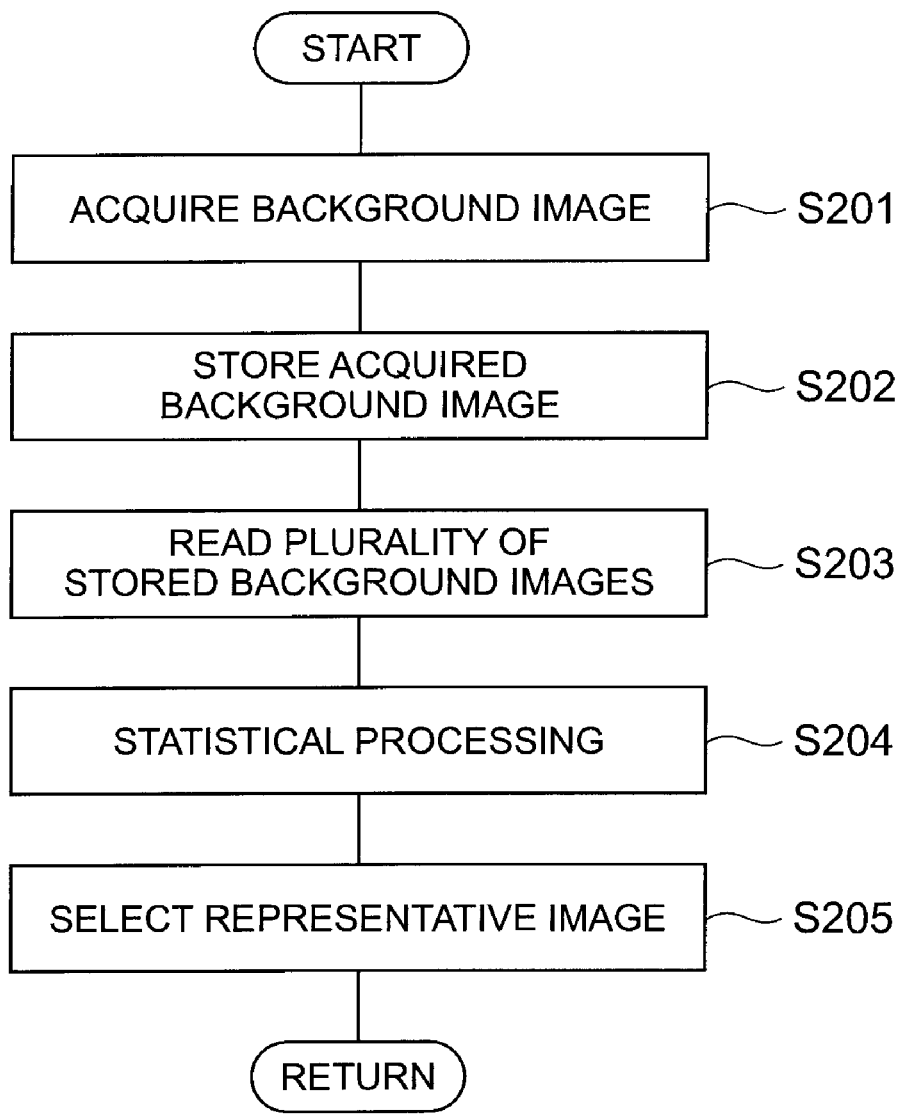
FIG. 14 is a flowchart showing a processing routine in an image processing apparatus according to the third embodiment.

FIG. 14 is a flowchart showing the processing routine in the image processing apparatus of this embodiment. As shown in FIG. 14, the image processing apparatus 201 foremost acquires the background image sent from the imaging apparatus 210 (S201), and stores it in the image database 211 (S202). Here, the image database 211 also stores the background images that were previously sent from the imaging apparatus 210. Thus, the image database 211 stores a plurality of background images that were taken and acquired by including a common spot under a plurality of different environmental conditions.

Subsequently, the statistical processing unit 212 reads the plurality of images stored in the image database 211 (S203). Here, the number of images that are read by the statistical processing unit 212 is, for example, 100 images. Needless to say, a suitable number of images may be read.

After the statistical processing unit 212 reads the plurality of images, it performs statistical processing to the plurality of images that were read (S204). The statistical processing in this case is performed, for instance, according to the following routine. Foremost, for each pixel in the background image, the brightness of that pixel is sought. Subsequently, the average brightness of pixels in the background image is sought. Next, the pixels are sorted based on whether the brightness of each pixel deviates from the average brightness at a prescribed value or greater.

Thereafter, an aggregate of pixels in which the brightness deviates from the average brightness at a prescribed value or greater is extracted among all pixels. The aggregate of pixels in which the brightness is of a prescribed value or greater will become the environmental condition-added region. Subsequently, the dispersion in all pixels regarding the extracted aggregate of pixels is sought. Then, the dispersion of pixels in which the brightness deviates from the average brightness at a prescribed value or greater in all pixels is sought for each of the plurality of background images.

Next, a background image with the smallest obtained dispersion is sought among the plurality of background images. The background image with the smallest dispersion among all pixels of the aggregate of pixels in which the brightness deviates from the average brightness at a prescribed value or greater is considered to be the image with the smallest environmental conditions among the images. The statistical processing unit 212 outputs this statistical processing result to the representative image selection unit 213.

The representative image selection unit 213 selects a representative image among the background images stored in the image database 211 based on the statistical processing result that was output from the statistical processing unit 212 (S205). The representative image selection unit 213 selects, based on the statistical processing result that was output from the statistical processing unit 212, the background image with the smallest dispersion among all pixels of the aggregate of pixels in which the brightness is of a prescribed value or greater as the representative image. The image processing is thereby ended.

As described above, the image processing apparatus 201 of this embodiment selects, among a plurality of background images, the background image with the smallest dispersion among all pixels of the aggregate of pixels in which the brightness deviates from the average brightness at a prescribed value or greater. The background image with the smallest dispersion among all pixels of the aggregate of pixels in which the brightness deviates from the average brightness at a prescribed value or greater is considered to be the background image that is least affected by the environmental conditions. Thus, it is possible to select an image with the smallest disturbance among the plurality of images in which images of the same spot were taken. In addition, the image processing apparatus 201 of this embodiment performs statistical processing to the background images and extracts an environmental condition-added region upon selecting the background image. Thus, the environmental condition-added region can be extracted easily and accurately.

Figure 15:
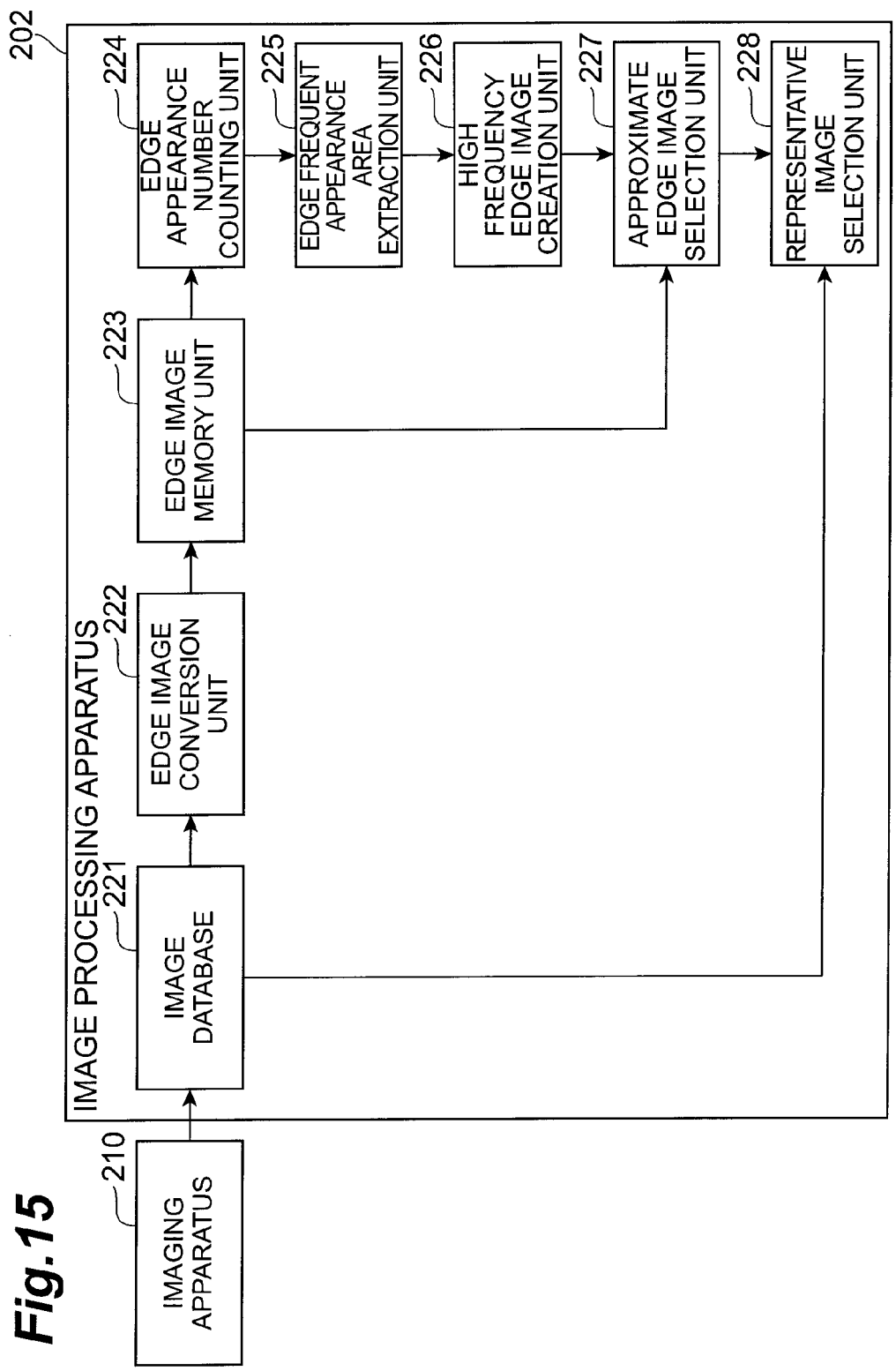
FIG. 15 is a block configuration diagram of an image processing apparatus according to the fourth embodiment.

The fourth embodiment of the present invention is now explained. FIG. 15 is a block configuration diagram of the image processing apparatus according to the fourth embodiment. As shown in FIG. 15, the image processing apparatus 202 of this embodiment comprises an image database 221, an edge image conversion unit 222, an edge image memory unit 223, and an edge appearance number counting unit 224. The image processing apparatus 202 additionally comprises an edge frequent appearance region extraction unit 225, a high frequency edge image creation unit 226, an approximate edge image selection unit 227, and a representative image selection unit 228. Moreover, an imaging apparatus 210 is connected to the image processing apparatus 202.

The image processing apparatus 202 stores a plurality of background images that were sent from the imaging apparatus 210 in the image database 221. The edge image conversion unit 222 performs edge processing to the background images stored in the image database 221 to create edge images. The edge image conversion unit 222 stores the created edge images in the edge image memory unit 223. The edge image memory unit 223 stores a plurality of edge images that were created with the edge image conversion unit 222.

The edge appearance number counting unit 224 measures the edge appearance count of the target pixel regarding the plurality of edge images stored in the edge image memory unit 223. The edge appearance number counting unit 224 outputs the measured edge appearance count to the edge frequent appearance region extraction unit 225.

The edge frequent appearance region extraction unit 225 extracts a region where the edge frequently appears in the edge image based on the edge appearance count that was output from the edge appearance number counting unit 224. The edge frequent appearance region extraction unit 225 outputs the extracted edge frequent appearance region to the high frequency edge image creation unit 226.

The high frequency edge image creation unit 226 creates a high frequency edge image based on the edge frequent appearance region that was output from the edge frequent appearance region extraction unit 225. The high frequency edge image creation unit 226 outputs the created high frequency edge image to the approximate edge image selection unit 227.

The approximate edge image selection unit 227 selects an approximate edge image that is the most approximately to the high frequency edge image among the edge images stored in the edge image memory unit 223 based on the high frequency edge image that was output from the high frequency edge image creation unit 226. The approximate edge image selection unit 227 outputs the selected approximate edge image to the representative image selection unit 228.

The representative image selection unit 228 selects, as the representative image, a background image corresponding to the approximate edge image among the background images stored in the image database 221 based on the approximate edge image that was output from the approximate edge image selection unit 227.

The processing routine of the image processing apparatus of this embodiment is now explained. The image processing apparatus 202 of this embodiment, as with the image processing apparatus 201 according to the third embodiment described above, performs processing for selecting an image that is suitable for subsequent image processing among a plurality of images that were taken and acquired by including a common spot under a plurality of different environmental conditions.

Figure 16:
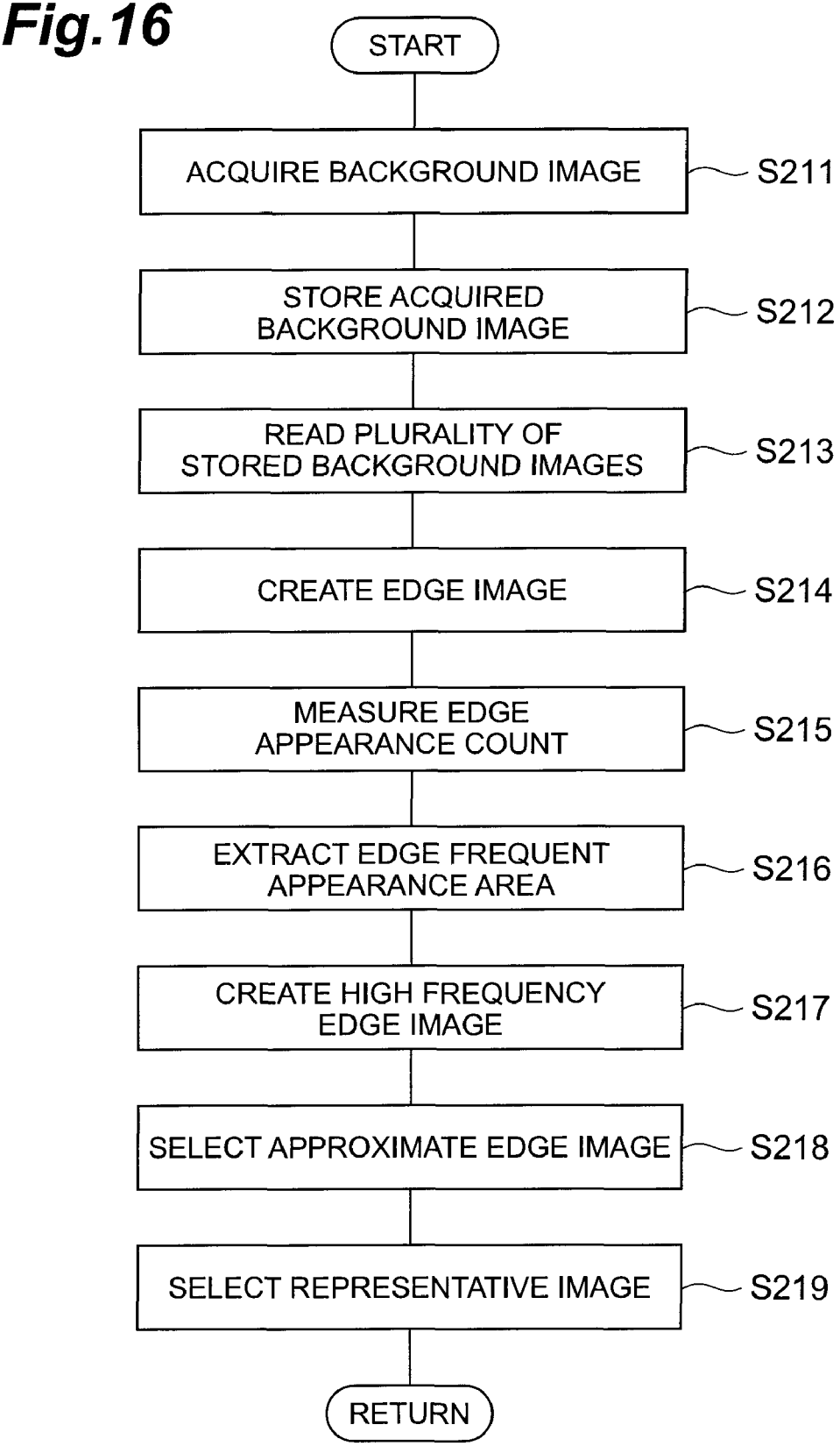
FIG. 16 is a flowchart showing a processing routine in an image processing apparatus according to the fourth embodiment.

FIG. 16 is a flowchart showing the processing routine in the image processing apparatus of this embodiment. As shown in FIG. 16, the image processing apparatus 202 foremost acquires the background image sent from the imaging apparatus 210 (S211), and stores it in the image database 221 (S212). Subsequently, the edge image conversion unit 222 reads the plurality of background images stored in the image database 221 (S213), and converts the respective background images into edge images (S214).

When converting a background image into an edge image, a publicly known edge image creation unit may be used. Specifically, a sobel filter may be used to calculate the edge strength per pixel. Here, a threshold value for determining the existence of an edge is set in advance, and edge images are created with pixels in which the edge strength exceeds this threshold value as having a pixel value of 1, and with pixels in which the edge strength falls below the threshold value has having a pixel value of 0.

After the edge images are created, the edge appearance count is counted with the edge appearance number counting unit 224 (S215). When counting the edge appearance count, it is determined whether the pixel value of the pixels corresponding to the same location among the plurality of edge images is 1 or 0, and, if the pixel value is 1, it means that an edge appeared, and this is counted as an edge appearance count. As described above, the edge appearance count in the pixels positioned at the same location among the plurality of edge images is counted.

When the edge appearance count of the pixels of the same location is counted with the edge appearance number counting unit 224, the edge frequent appearance region is extracted with the edge frequent appearance region extraction unit 225 (S216). The edge frequent appearance region extraction unit 225 stores a threshold value for determining the edge frequent appearance region regarding the edge appearance count in the respective pixels. The edge frequent appearance region extraction unit 225 compares the edge appearance count of the respective pixels that is output from the edge appearance number counting unit 224 and the stored threshold value, and detects a pixel in which the edge appearance count exceeds the threshold value as an edge pixel. The edge frequent appearance region extraction unit 225 extracts an aggregate of the extracted edge pixels as the edge frequent appearance region.

Subsequently, the high frequency edge image creation unit 226 creates a high frequency edge image (S217). The high frequency edge image creation unit 226 creates a high frequency edge image based on the aggregate of edge pixels that was output from the edge frequent appearance region extraction unit 225.

Once the high frequency edge image is created, the approximate edge image selection unit 227 selects an approximate edge image that is the most approximate to the high frequency edge image among the plurality of edge images that are stored in the edge image memory unit 223 (S218). Upon selecting the approximate edge image, each of the plurality of edge images that is stored in the edge image memory unit 223 and the high frequency edge image that was output from the high frequency edge image creation unit 226 are compared. During this comparison, the number of pixels corresponding to the non-edge pixels other than the edge pixels in the high frequency edge image which have become edge pixels is counted. Then, the edge image in which the number of pixels corresponding to the non-edge pixels other than the edge pixels in the high frequency edge image which have become edge pixels is smallest is selected as the approximate edge image having the highest coincidence level with the high frequency edge image.

Once the approximate edge image is selected, the representative image selection unit 228 selects the representative image (S219). Upon selecting the representative image, the background image that was used in creating the approximate edge image among the plurality of background images that are stored in the image database 221 is selected as the representative image. The processing in the image processing apparatus 202 is thereby complete.

Figure 17:
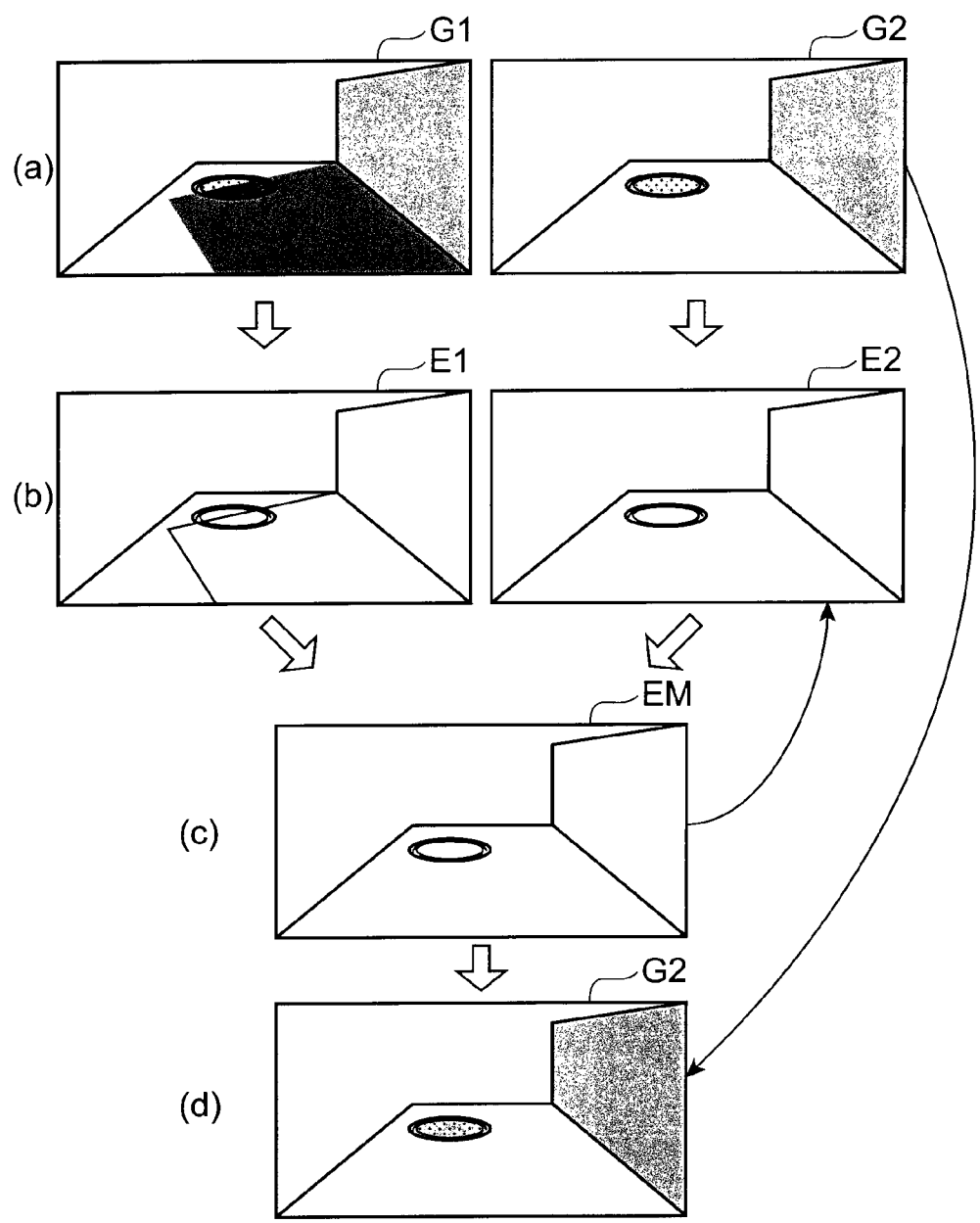
FIG. 17 is an explanatory diagram schematically explaining a processing routine in an image processing apparatus according to the fourth embodiment using image examples.

To briefly explain the processing routine of the image processing apparatus 202 of this embodiment with reference to FIG. 17 taking an example of a case where there are two background images, as shown in (a) of FIG. 17, edge processing is respectively performed to a first background image G1 and a second background image G2 to respectively create a first edge image E1 and a second edge image E2 as shown in (b) of FIG. 17. A high frequency edge image EM shown in (c) of FIG. 17 is created from these edge images E1, E2. The high frequency edge image EM is respectively compared with the edge images E1, E2 to select the approximate edge image. In this example, the number of pixels corresponding to the non-edge pixels in the high frequency edge image that became edge pixels is smaller in the second edge image E2 in comparison to the first edge image E1. Thus, the second edge image E2 is selected as the approximate edge image. Then, as shown in (d) of FIG. 17, the second background image G2 corresponding to the second edge image E2 is selected as the representative image.

As described above, in addition to yielding the same operation and effect as the third embodiment described above, the image processing apparatus 202 of this embodiment selects a background image corresponding to an edge image with the lowest edge appearance ratio in the non-edge pixels other than the edge pixels as pixels with a large edge appearance count regarding the plurality of edge images that were created from the background images. Consequently, since it is possible to select an image with a high occupancy of edge pixels, the influence of noise other than added environmental condition can be alleviated, and an image with the smallest disturbance can be selected among a plurality of background images.

Figure 18:
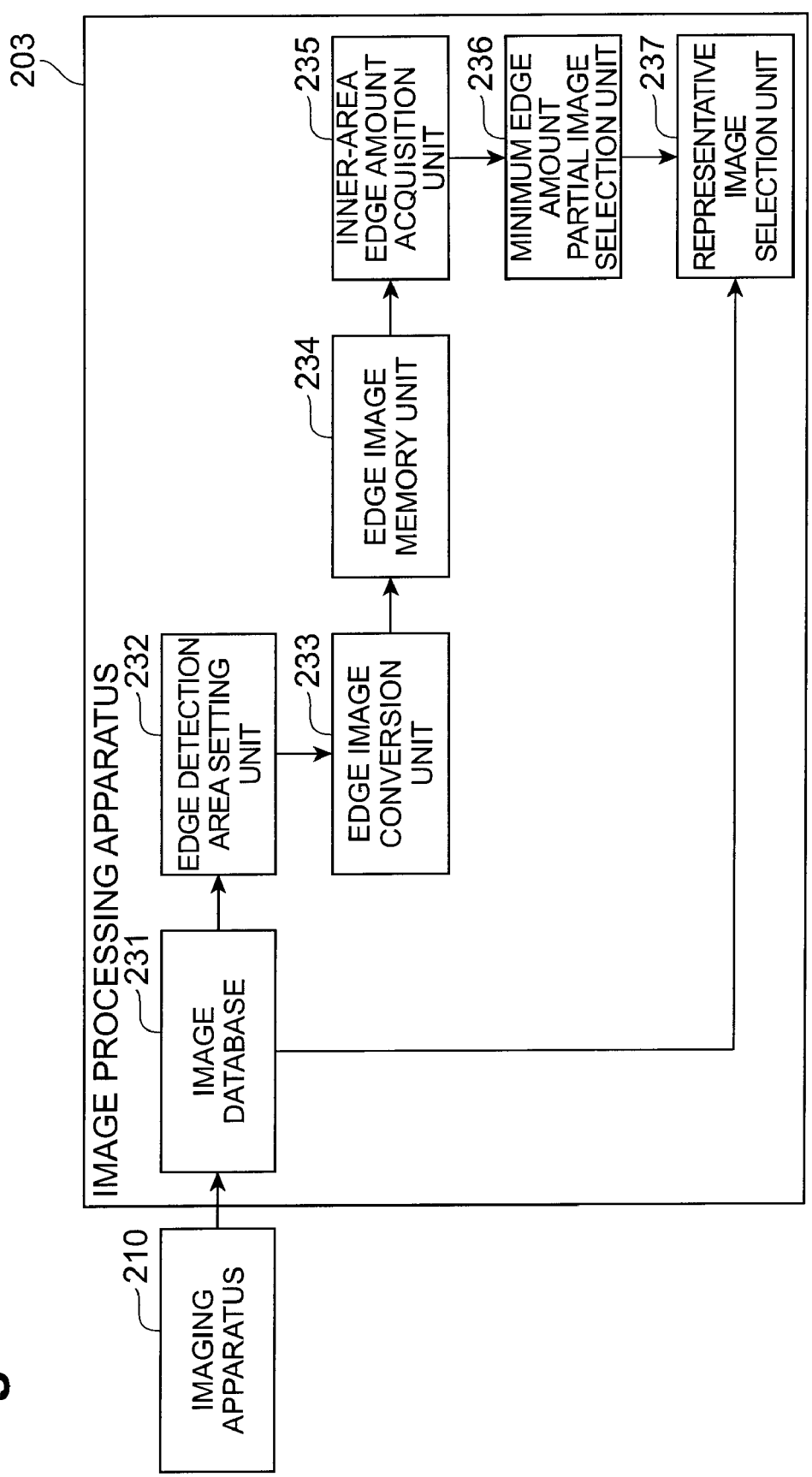
FIG. 18 is a block configuration diagram of an image processing apparatus according to the fifth embodiment.

The fifth embodiment of the present invention is now explained. FIG. 18 is a block configuration diagram of the image processing apparatus according to the fifth embodiment. As shown in FIG. 18, image processing apparatus 203 of this embodiment comprises an image database 231, an edge detection region setting unit 232, an edge image conversion unit 233, an edge image memory unit 234, and an inner-region edge amount acquisition unit 235. The image processing apparatus 203 additionally comprises a minimal edge amount partial image selection unit 236, and a representative image selection unit 237. Moreover, an imaging apparatus 210 is connected to the image processing apparatus 203.

The image processing apparatus 203 stores a plurality of background images that were sent from the imaging apparatus 210 in the image database 231. The edge detection region setting unit 232 sets a prescribed partial region in each of the plurality of background images that is stored in the image database 231. The partial region to be set here may be decided approximately, and it may be the periphery of a specific position, or the overall background image.

The edge image conversion unit 233 performs edge processing to the partial regions set by the edge detection region setting unit 232 in the background images that are stored in the image database 221 to create partial edge images. The edge image conversion unit 233 stores the created partial edge images in the edge image memory unit 234. The edge image memory unit 234 stores a plurality of partial edge images that were created with the edge image conversion unit 233.

The inner-region edge amount acquisition unit 235 determines whether the pixels in the partial edge image that was created from a partial region in the background image and stored in the edge image memory unit 234 are edge pixels or non-edge pixel, and acquires the amount of edge pixels in the partial edge image. The inner-region edge amount acquisition unit 235 outputs the acquired edge amount in the respective partial edge images to the minimal edge amount partial image selection unit 236.

The minimal edge amount partial image selection unit 236 selects a minimal edge amount image based on the edge amount in the partial edge image that was output from the inner-region edge amount acquisition unit 235. Here, the partial edge image with the lowest edge amount among the partial edge images is selected as the minimal edge amount image. The minimal edge amount partial image selection unit 236 outputs the selected minimal edge amount image to the representative image selection unit 237.

The representative image selection unit 237 selects, as the representative image, the background image containing the partial region corresponding to the minimal edge amount image that was output from the minimal edge amount partial image selection unit 236 among the background images stored in the image database 231 based on the minimal edge amount image that was output from the minimal edge amount partial image selection unit 236.

The processing routine in the image processing apparatus of this embodiment is now explained. The image processing apparatus 203 of this embodiment, as with the image processing apparatus 201 according to the third embodiment described above, performs processing for selecting an image that is suitable for subsequent image processing among a plurality of images that were taken and acquired by including a common spot under a plurality of different environmental conditions.

Figure 19:
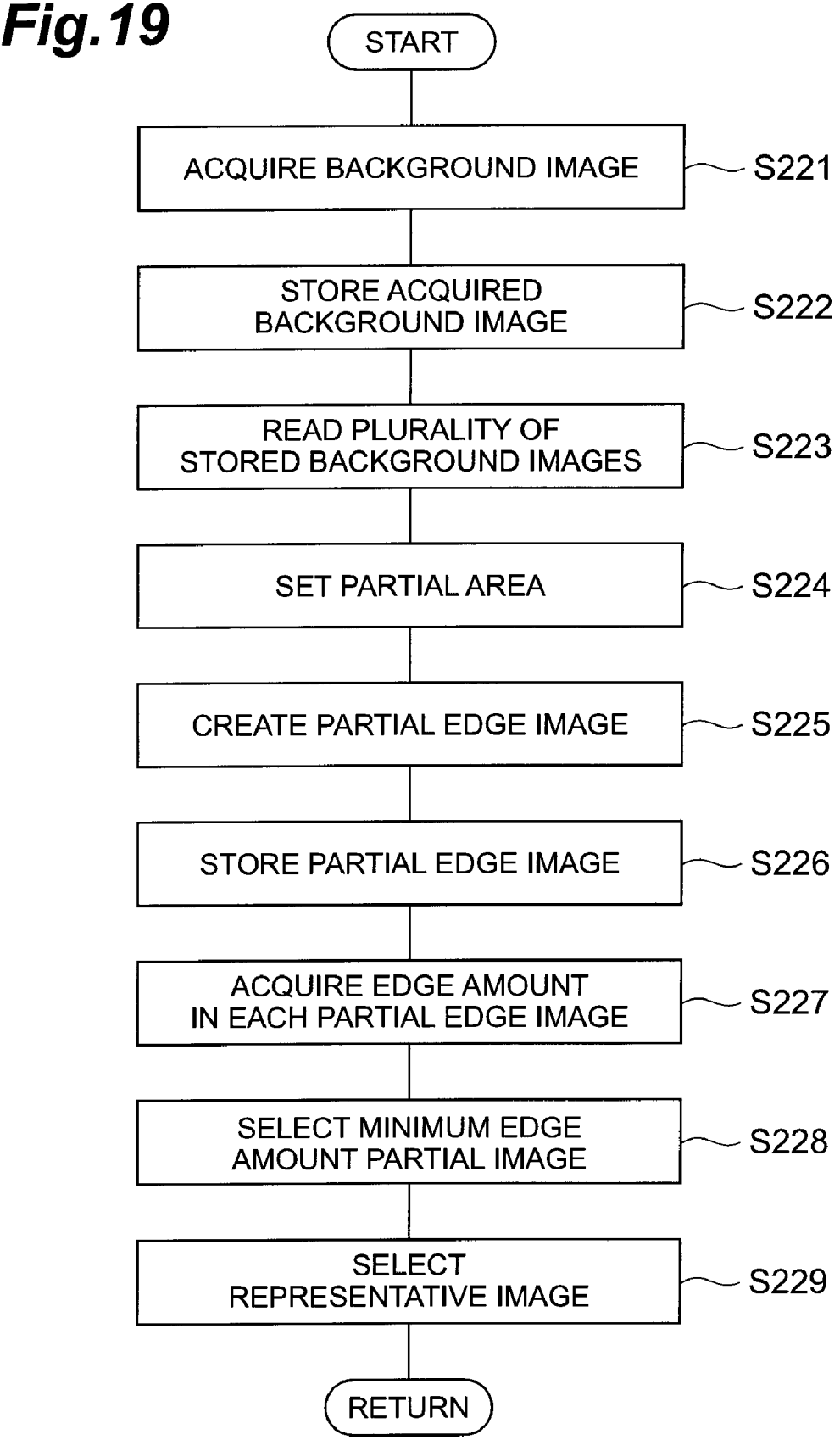
FIG. 19 is a flowchart showing a processing routine in an image processing apparatus according to the fifth embodiment.

FIG. 19 is a flowchart showing the processing routine in the image processing apparatus of this embodiment. As shown in FIG. 19, the image processing apparatus 203 foremost acquires a background image that is sent from the imaging apparatus 210 (S221), and stores it in the image database 231 (S222). Subsequently, the edge detection region setting unit 232 reads the plurality of background images that are stored in the image database 231 (S223), and sets the partial region to perform the edge detection (S224). Here, the partial detection region may be a predetermined region, or may otherwise be set according to a suitable method. Moreover, in this embodiment, although the edge detection region is a partial detection from a part of the background image, the overall background image may also be used as the edge detection region.

Once the partial region is set, edge processing is performed to the partial region in each background image to create a partial edge image (S225). Upon converting the partial region in the background image to an edge image, a publicly known edge image creation unit may be used. Specifically, a sobel filter may be used to calculate the edge strength per pixel. Here, a threshold value for determining the existence of an edge is set in advance, and edge images are created with pixels in which the edge strength exceeds this threshold value as having a pixel value of 1, and with pixels in which the edge strength falls below the threshold value has having a pixel value of 0.

Once the partial edge image is created, the created partial edge image is stored in the edge image memory unit 234 (S226). Since the partial edge image is created for each background image, a plurality of partial edge images are stored in the edge image memory unit 234. Subsequently, the inner-region edge amount acquisition unit 235 acquires the edge amount in the partial edge image (S227). Here, the pixel value in each partial edge image is referred to, and the number of pixels in which the pixel value is 1 is acquired.

Then, the minimal edge amount partial image selection unit 236 selects the minimal edge amount partial image (S228). Here, the edge pixel count of each partial edge image is compared, and the partial edge image with the lowest edge pixel count is selected as the minimal edge amount partial image.

Subsequently, the representative image selection unit 237 selects, as the representative image, the background image containing the partial region corresponding to the minimal edge amount partial image among the background images that are stored in the image database 231 (S229). The processing in the image processing apparatus 203 is thereby ended.

Figure 20:
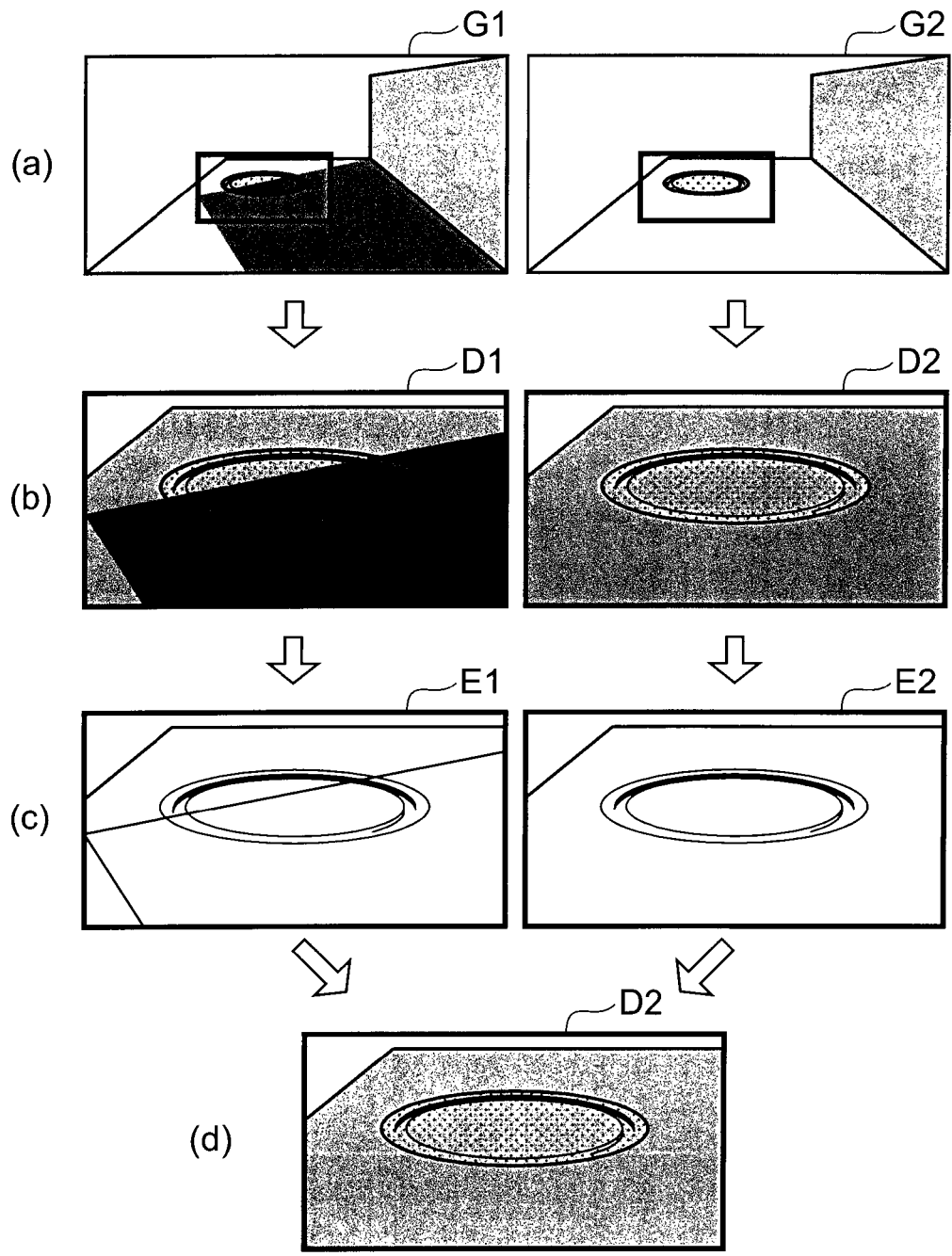
FIG. 20 is an explanatory diagram schematically explaining a processing routine in an image processing apparatus according to the fifth embodiment using image examples.

To briefly explain the processing routine of the image processing apparatus 203 of this embodiment with reference to FIG. 20 taking an example of a case where there are two background images, as shown in (a) of FIG. 20, a first partial region image D1 and a second partial region image D2 shown in (b) of FIG. 20 are set to a first background image G1 and a second background image G2. As a result of performing edge processing to the first partial region image D1 and the second partial region image D2, a first partial edge image E1 and a second partial edge image E2 shown in (c) of FIG. 20 are created. The number of edge pixels in the first partial edge image E1 and the second partial edge image E2 is determined to select the minimal edge amount partial image. In this example, since the second partial edge image E2 has fewer edge pixels than the first partial edge image E1, as shown in (d) of FIG. 20, the second partial region image D2 will become the minimal edge amount partial image. Subsequently, the second background image G2 containing the second partial region image D2 is selected as the representative image among the background images that are stored in the image database 231.

As described above, in addition to yielding the same operation and effect as the third embodiment described above, the image processing apparatus 203 of this embodiment selects, as the representative image, the background image containing a partial region corresponding to the minimal edge amount partial image as the partial edge image with the lowest edge pixel count regarding the plurality of partial edge images in which edge processing was performed the partial regions set in the background images. Thus, since it is possible to accurately detect locations that are not affected by variations in the added environmental conditions such as lighting, an image with the smallest disturbance can be selected among a plurality of background images.

Although the preferred embodiments of the present invention were explained above, the present invention is not limited by the foregoing embodiments. For instance, although each of the foregoing embodiments took the mode of fixing the imaging apparatus 210 and taking images of the same spot, for instance, a mode where images of a prescribed position that the vehicle passes by on a daily basis may be taken on different dates and times may also be adopted. Accordingly, as a "common spot," in addition to spots that are completely the same, an approximate spot which at least overlaps with the imaging range may also be used.

Moreover, in the fourth embodiment and fifth embodiment described above, although an edge image or a partial edge image is created by performing edge processing to the background image or a part thereof, the texture in the image may be sought and the texture concentration may be used to select an image with few changes in the added environmental condition. In the foregoing case, an image can be stably selected in cases where edges appear and do not appear in the image.

Further, although the third embodiment described above selects, as the representative image, the background image with the smallest dispersion among all pixels of the aggregate of pixels in which the brightness deviates from the average brightness at a prescribed value or greater, in addition to this mode, another mode of deciding the representative image based on the dispersion in all pixels of the aggregate of pixels in which the brightness deviates from the average brightness at a prescribed value or greater may also be adopted. For instance, an image in which the dispersion in all pixels of the aggregate of pixels in which the brightness deviates from the average brightness at a prescribed threshold value (reference dispersion value) or lower may be used as the representative image.

In addition, although the fourth embodiment described above selected, as the representative image, the background image corresponding with the approximate edge image that is most approximate to the high frequency edge image, in addition to this mode, another mode of deciding the edge image based on the approximation level relative to that of the high frequency edge image and deciding the background image corresponding to that edge image as the representative image may also be adopted. For instance, a background image corresponding to the edge image in which the approximation level relative to that of the high frequency edge image exceeds a prescribed threshold value (reference approximation level) may be used as the representative image.

Moreover, although the fifth embodiment described above selects, as the representative image, the background image containing a partial region corresponding to the minimal edge amount partial image, in addition to this mode, another mode of selecting the edge amount partial image based on the occupancy level of the edge amount in the partial edge image, and using the background image containing the partial region corresponding to that edge amount partial image as the representative image may also be used. For example, a background image containing a partial region corresponding to the edge amount partial image in which the occupancy level of the edge amount in the partial edge image exceeds a prescribed threshold value (reference occupancy level) may be used as the representative image.

As explained above, according to the image search apparatus and image processing apparatus of the present invention, an image that is suitable for use in image processing can be accurately selected among a plurality of images. In addition, as a result of using the selected image, it is possible to reduce the processing load upon searching for an image corresponding to the input image.

Moreover, the foregoing first or second embodiment may be combined with any one of the third to fifth embodiments described above.

What is claimed is:

1. An image search apparatus for searching for a search-target image corresponding to an input image from among a plurality of search-target images, comprising:
    a characteristic partial image detection unit for detecting a characteristic partial image of each search-target image based on a dissimilarity level of a partial image at a corresponding position among a plurality of search-target images, the characteristic partial image detection unit comprising:
        a candidate extraction unit for extracting a candidate of a characteristic partial image from each search-target image;
        an appearance number counting unit for counting, for each candidate of a characteristic partial image of an arbitrary search-target image extracted by the candidate extraction unit, the number of times that the partial image of the candidate appears in other search-target images; and
        a detection unit for detecting a candidate with a low appearance count counted by the appearance number counting unit as a characteristic partial image; and
    a search unit for respectively calculating a level of coincidence between the characteristic partial image of each search-target image detected with the characteristic partial image detection unit and the partial image of the input image, and searching for a search-target image corresponding to the input image from among a plurality of search-target images based on the coincidence level.

2. The image search apparatus according to claim 1, wherein
    the search unit calculates a level of coincidence between the characteristic partial image of a search-target image and the partial image of the input image at a corresponding position.

3. An image processing apparatus, comprising:
    an image input unit for inputting a plurality of images picked up and acquired including a common spot under a plurality of different environmental conditions;
    an image memory unit for storing the plurality of images;
    an environmental condition-added region extraction unit for extracting an environmental condition-added region added based on the environmental conditions in each of the plurality of images; and
    an added environmental condition reference selection-image selection unit for selecting an added environmental condition reference selection image from among a plurality of images stored in the image memory unit based on an area of the environmental condition-added region.

4. The image processing apparatus according to claim 3, wherein the added environmental condition reference selection-image selection unit is an added environmental condition small-size-image selection unit for selecting an environmental load condition small-size-image, in which the area of the environmental condition-added region is smaller than a prescribed area, from among a plurality of images stored in the image memory unit.

5. The image processing apparatus according to claim 3, wherein the added environmental condition reference selection-image selection unit is an added environmental condition minimal image selection unit for selecting an image, in which the area of the environmental condition-added region is smallest, as an environmental load condition minimal-image from among a plurality of images stored in the image memory unit.

6. The image processing apparatus according to claim 3, wherein the environmental condition-added region extraction unit extracts the environmental condition-added region by performing statistical processing to the plurality of images.

7. The image processing apparatus according to claim 3, wherein the environmental condition-added region extraction unit comprises:
an edge image conversion unit for converting each of the plurality of images into an edge image;
an edge image memory unit for storing the plurality of edge images converted by the edge image conversion unit;
an edge appearance number measurement unit for measuring the number of edge appearances in a prescribed region of the plurality of edge images;
an edge frequent appearance region extraction unit for extracting an edge frequent appearance region as a prescribed region from among the prescribed regions in which the number of edge appearances exceeds a prescribed threshold value; and
an edge frequent appearance region memory unit for storing the edge frequent appearance region,
wherein the added environmental condition reference selection-image selection unit includes:
a high frequency edge image creation unit for creating a high frequency edge image based on each edge frequent appearance region in the plurality of edge images; and
an approximation level reference edge image extraction unit for extracting an approximation level reference selection edge image from among a plurality of edge images stored in the edge image memory unit based on an approximation level relative to that of the high frequency edge image, and
wherein the added environmental condition reference selection-image selection unit selects an image corresponding to the approximation level reference selection edge image as the added environmental condition reference selection image from among a plurality of images stored in the image memory unit.

8. The image processing apparatus according to claim 7, wherein the approximation level reference edge image extraction unit extracts, as the approximation level reference selection edge image, a high approximate edge image which is as an edge image in which an approximation level relative to that of the high frequency edge image exceeds a prescribed threshold value.

9. The image processing apparatus according to claim 7, wherein the approximation level reference edge image extraction unit extracts, as an approximation level reference selection edge image, an approximate edge image which is as an edge image that is most approximate to the high frequency edge image.

10. The image processing apparatus according to claim 3, wherein the environmental condition-added region extraction unit comprises:
an edge image conversion unit for converting each of the plurality of images into an edge image; and
an edge amount calculation unit for calculating an edge amount of each of the prescribed regions in each of the edge images,
wherein the added environmental condition reference selection-image selection unit comprises:
an edge amount occupancy level reference selection edge image selection unit for selecting an edge amount occupancy level reference selection edge image, based on an edge amount occupancy level of the prescribed region in the edge image; and
an edge amount occupancy level reference selection image selection unit for selecting an image corresponding to the edge amount occupancy level reference selection edge image as the added environmental condition reference selection image from among a plurality of images stored in the image memory unit.

11. The image processing apparatus according to claim 10, wherein the edge amount occupancy level reference selection edge image selection unit selects a small edge amount edge image as the edge amount occupancy level reference selection edge image in which an edge amount of the prescribed region in the edge image falls below a prescribed occupancy level.

12. The image processing apparatus according to claim 10, wherein the edge amount occupancy level reference selection edge image selection unit selects a minimal edge amount edge image as the edge amount occupancy level reference selection edge image in which an edge amount of the prescribed region in the edge image becomes minimal.

* * * * *